(12) United States Patent
Shen et al.

(10) Patent No.: US 11,194,400 B2
(45) Date of Patent: Dec. 7, 2021

(54) GESTURE DISPLAY METHOD AND APPARATUS FOR VIRTUAL REALITY SCENE

(71) Applicant: TENCENT TECHNOLOGY (SHENZHEN) COMPANY LIMITED, Shenzhen (CN)

(72) Inventors: Chao Shen, Shenzhen (CN); Xueqiang Wang, Shenzhen (CN); Honghao Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/509,038

(22) Filed: Jul. 11, 2019

(65) Prior Publication Data
US 2019/0332182 A1    Oct. 31, 2019

Related U.S. Application Data

(63) Continuation of application No. PCT/CN2018/081258, filed on Mar. 30, 2018.

(30) Foreign Application Priority Data

Apr. 25, 2017  (CN) .......................... 201710278577.2
Apr. 26, 2017  (CN) .......................... 201710292385.7

(51) Int. Cl.
G06F 3/01        (2006.01)
A63F 13/00       (2014.01)
(Continued)

(52) U.S. Cl.
CPC .............. G06F 3/017 (2013.01); A63F 13/00 (2013.01); G06T 19/006 (2013.01); G06T 19/20 (2013.01); A63F 2300/8082 (2013.01)

(58) Field of Classification Search
None
See application file for complete search history.

(56) References Cited

U.S. PATENT DOCUMENTS

2013/0229345 A1*  9/2013  Day ...................... G06F 3/005
                                                        345/158
2014/0375539 A1* 12/2014  Gabara ................. G06F 3/017
                                                        345/156
(Continued)

FOREIGN PATENT DOCUMENTS

CN    102023706 A    4/2011
CN    104656878 A    5/2015
(Continued)

OTHER PUBLICATIONS

International Search Report dated Jul. 5, 2018 in Application No. PCT/CN2018/081258 with English Translation.
(Continued)

Primary Examiner — Michelle Chin
(74) Attorney, Agent, or Firm — Oblon, McClelland, Maier & Neustadt, L.L.P.

(57) ABSTRACT

Aspects of the disclosure provide methods and apparatuses for displaying a gesture in a virtual reality (VR) environment. In some examples, an apparatus for displaying the gesture in the virtual reality (VR) environment includes processing circuitry. The processing circuitry displays a first gesture object corresponding to a state of a virtual hand when the virtual hand does not hold a virtual article. The processing circuitry displays a second gesture object when a ray of the first gesture object intersects the virtual article. The second gesture object indicates that the virtual article is in front of the virtual hand. The ray extends from the virtual hand. The processing circuitry displays a third gesture object in response to a selection instruction. The third gesture
(Continued)

object corresponds to a state of the virtual hand when the virtual hand holds the virtual article.

20 Claims, 16 Drawing Sheets

(51) Int. Cl.
*G06T 19/00* (2011.01)
*G06T 19/20* (2011.01)

(56) References Cited

U.S. PATENT DOCUMENTS

| | | | |
|---|---|---|---|
| 2016/0170603 A1* | 6/2016 | Bastien | G06F 3/005 348/49 |
| 2016/0378197 A1 | 12/2016 | Latta et al. | |
| 2017/0031502 A1* | 2/2017 | Rosenberg | G06F 3/04144 |
| 2017/0329419 A1* | 11/2017 | Dearman | G06F 3/011 |
| 2017/0329488 A1* | 11/2017 | Welker | G06F 3/04845 |
| 2019/0050062 A1* | 2/2019 | Chen | G06T 7/70 |
| 2019/0347865 A1* | 11/2019 | Hackett | G06F 30/00 |

FOREIGN PATENT DOCUMENTS

| | | |
|---|---|---|
| CN | 105353873 A | 2/2016 |
| CN | 105867599 A | 8/2016 |
| CN | 105912110 A | 8/2016 |
| CN | 105975072 A | 9/2016 |
| CN | 106020633 A | 10/2016 |
| CN | 106249882 A | 12/2016 |
| CN | 106445118 A | 2/2017 |
| CN | 106527702 A | 3/2017 |
| CN | 107132917 A | 9/2017 |

OTHER PUBLICATIONS

Written Opinion dated Jul. 5, 2018 in Application No. PCT/CN2018/081258.
Chinese Office Action dated Mar. 6, 2018 in Application No. CN201710278577.2 with partial English Translation.
Chinese Office Action dated Mar. 8, 2018 in Application No. CN201710292385.7 with partial English Translation.
Chinese Office Action dated May 9, 2018 in Application No. CN201710292385.7 with partial English Translation.

* cited by examiner

GESTURE DISPLAY METHOD AND APPARATUS FOR VIRTUAL REALITY SCENE

RELATED APPLICATION

This application is a continuation of International Application No. PCT/CN2018/081258, filed on Mar. 30, 2018, which claims priority to Chinese Patent Application No. 201710278577.2, entitled "GESTURE DISPLAY METHOD AND APPARATUS FOR VIRTUAL REALITY SCENE" and filed on Apr. 25, 2017, and to Chinese Patent Application No. 201710292385.7, entitled "OBJECT PROCESSING METHOD AND APPARATUS IN VIRTUAL SCENE" and filed on Apr. 26, 2017. The entire disclosures of the prior applications are incorporated herein by reference in their entirety.

FIELD OF THE TECHNOLOGY

Embodiments of this application relate to the field of virtual reality (VR), and in particular, to a gesture display method and apparatus for a VR scene.

BACKGROUND OF THE DISCLOSURE

In a virtual environment provided in a VR system, in most cases, a VR handle needs to be operated with both hands of a user to interact with a virtual article.

In a typical VR system, a VR handle is provided with a key corresponding to a finger of a user. In a virtual environment, a virtual hand is provided for the user. A position of the virtual hand moves with movement of the VR handle by the user. When the finger of the user presses the key of the VR handle, a finger of the virtual hand in the virtual environment is folded and is in a curled state; and when the finger of the user releases the key of the VR handle, the finger of the virtual hand in the virtual environment lifts and is in a spread state. When the virtual hand in the virtual scene comes into contact with a virtual article, if a thumb and an index finger press corresponding keys at the same time, the virtual hand may grab the virtual article in the virtual environment in the hand.

The foregoing interaction manner is a near field interaction manner. When it is necessary to grab a virtual article far away in a virtual environment with a virtual hand, a user can move a VR handle to move the virtual hand to a position that is in contact with the virtual article, to grab the virtual article.

SUMMARY

Aspects of the disclosure provide methods and apparatuses for displaying a gesture in a virtual reality (VR) environment. In some examples, an apparatus for displaying the gesture in the virtual reality (VR) environment includes processing circuitry.

The processing circuitry displays a first gesture object corresponding to a state of a virtual hand when the virtual hand does not hold a virtual article. The processing circuitry displays a second gesture object when a ray of the first gesture object intersects the virtual article. The second gesture object indicates that the virtual article is in front of the virtual hand. The ray extends from the virtual hand. The processing circuitry displays a third gesture object in response to a selection instruction. The third gesture object corresponds to a state of the virtual hand when the virtual hand holds the virtual article.

In an embodiment, before displaying the second gesture object, the processing circuitry further determines a gesture position of the first gesture object in a virtual environment according to a motion status of a hand in a real environment. The processing circuitry determines a ray position of the ray in the virtual environment according to the gesture position. The processing circuitry detects whether the ray position overlaps an article position of the virtual article in the virtual environment. The processing circuitry determines that the ray intersects the virtual article when the ray position overlaps the article position.

In an embodiment, after displaying the first gesture object, the processing circuitry further displays the third gesture object when the first gesture object intersects the virtual article and the selection instruction is received. The processing circuitry determines a gesture position of the first gesture object in a virtual environment according to a motion status of a hand in a real environment. The processing circuitry detects whether the gesture position overlaps an article position of the virtual article in the virtual environment. The processing circuitry determines that the first gesture object intersects the virtual article when the gesture position overlaps the article position.

In an embodiment, the processing circuitry displays the third gesture object according to a type of the virtual article.

In an embodiment, the processing circuitry displays the virtual article in a preset display manner when the ray intersects the virtual article. The preset display manner is different from an original display manner of the virtual article.

In an embodiment, after displaying the third gesture object, the processing circuitry displays the first gesture object in response to a placement instruction.

In an embodiment, after displaying the first gesture object, the processing circuitry displays a fourth gesture object in response to a press instruction. The fourth gesture object corresponds to a state of the virtual hand when a finger of the virtual hand is in a curled state.

In an embodiment, after displaying the fourth gesture object, the processing circuitry displays a fifth gesture object in response to a release instruction. The fifth gesture object corresponds to a state of the virtual hand when the finger of the virtual hand is in a spread state.

Aspects of the disclosure also provide a non-transitory computer-readable medium storing instructions which when executed by at least one processor cause the at least one processor to perform any of the methods for displaying a gesture in a virtual reality (VR) environment.

BRIEF DESCRIPTION OF THE DRAWINGS

To describe the technical solutions in the embodiments of this application more clearly, the following briefly describes the accompanying drawings required for describing the embodiments. The accompanying drawings in the following description show some embodiments of this application, and a person of ordinary skill in the art may still derive other drawings from these accompanying drawings.

DESCRIPTION OF EMBODIMENTS

To make objectives, technical solutions, and advantages of this application clearer, the following further describes in detail implementations of this application with reference to the accompanying drawings.

First, some nouns or terms appearing in a process of describing the embodiments of this application are suitable for the following explanations:

VR: Virtual reality, which is referred to as a virtual technology for short and is also referred to as a virtual environment, generates a virtual world of three-dimensional (3D) space through computer simulation, and provides a user with simulation of a visual sense or another sense, so that the user feels as if the user is immersed, and can observe things in the 3D space in a timely and unrestricted manner.

Steam: a digital distribution, digital copyright management, and social system published by Valve Corporation on Sep. 12, 2003. Steam is used for distribution and sales and subsequent updates of digital software and games, supports operating systems such as Windows, OS X, and Linux, and is the world's largest platform for PC digital gaming at present.

Steam VR: fully functional 360° room space VR experience. This development kit includes a head mounted display, two single-handheld controllers, and a positioning system that can simultaneously track the display and controller in space.

Oculus: an American VR technology company founded by Palmer Luckey and Brendan Iribe. Their first product Oculus Rift is a realistic VR head mounted display.

Oculus Touch: a motion capture handle of Oculus Rift, and used in coordination with a space positioning system. Oculus Touch uses a bracelet-like design that allows a camera to track a hand of a user, where a sensor can also track finger movement, and further provides the user with a convenient grabbing manner.

Figure 1A:
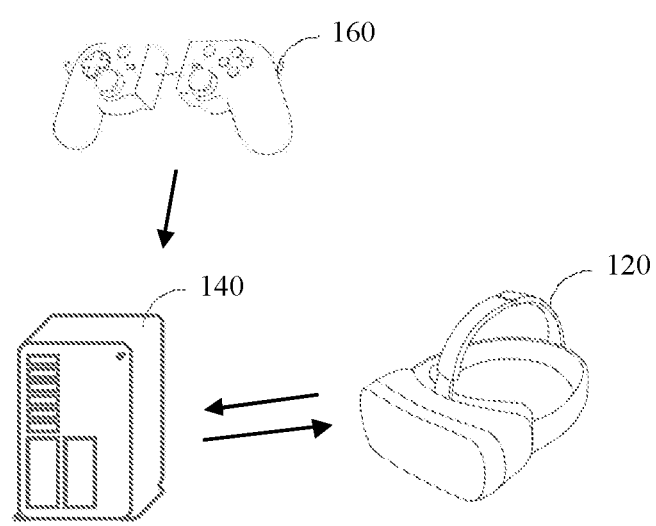
FIG. 1A is a schematic structural diagram of a gesture display system for a VR scene according to an embodiment of this application.

FIG. 1A is a schematic structural diagram of a VR system according to an embodiment of this application. The VR system includes a head mounted display 120, a VR host 140, and an input device 160.

The head mounted display 120 is a display to be worn on a head of a user for image display. The head mounted display 120 generally includes a wearing portion and a display portion. The wearing portion includes a glasses temple and an elastic band for wearing the head mounted display 120 on the head of the user. The display portion includes a left-eye display screen and a right-eye display screen. The head mounted display 120 can display different images on the left-eye display screen and a right-eye display screen, to simulate a 3D virtual environment for the user.

In an embodiment, the head mounted display 120 is provided with a motion sensor that captures movement of the head of the user, so that the VR host 140 changes a display picture of a virtual head in the head mounted display 120.

The head mounted display 120 is electrically connected to the VR host 140 by using a flexible circuit board, a hardware interface, a data line, or a wireless network.

The VR host 140 models a 3D virtual environment, generates a 3D display picture corresponding to the 3D virtual environment, generates a virtual article in the 3D virtual environment, and the like. It is noted that the VR host 140 may also model a two-dimensional (2D) virtual environment, generate a 2D display picture corresponding to the 2D virtual environment, and generate a virtual article in the 2D virtual environment; or the VR host 140 may model a 3D virtual environment, generate, according to a position of an angle of view of the user, a 2D display picture corresponding to the 3D virtual environment, generate a 2D projection picture of a virtual article in the 3D virtual environment, and the like. This is not limited in this application.

In an embodiment, the VR host 140 may be integrated into the interior of the head mounted display 120, or may be integrated into another device different from the head mounted display 120. This is not limited in this application. In this embodiment, an example in which the VR host 140 is integrated into another device different from the head mounted display 120 is used for description. The device may be a desktop computer, a server, or the like. This is not limited in this application. That is, in some implementations, the VR host 140 may be a partial component (software, hardware, or a component combining software and hardware) in the head mounted display 120, a terminal, or a server.

The VR host 140 receives an input signal of the input device 160, and generates a display picture of the head mounted display 120 according to the input signal. The VR host 140 is generally implemented by an electronic device such as a processor, a memory, or an image VR host disposed on a circuit board. In an embodiment, the VR host 140 further includes an image acquisition apparatus that captures the movement of the head of the user and changes the display picture of the virtual head in the head mounted display 120 according to the movement of the head of the user.

The VR host 140 is connected to the input device 160 through a cable or Bluetooth connection or a Wi-Fi connection.

The input device 160 may be at least one input peripheral in a somatosensory glove, a somatosensory handle, a remote control, a treadmill, a mouse, a keyboard, and a human eye focusing device.

It is noted that the input device 160 may also be referred to as another name, for example, a first target object or a first target device. This is not limited in this application.

In an embodiment, in this embodiment, an example in which the input device 160 is a device needing to be operated with both hands of the user is used for description. For example, the input device 160 is a somatosensory glove or a somatosensory handle.

Figure 1B:
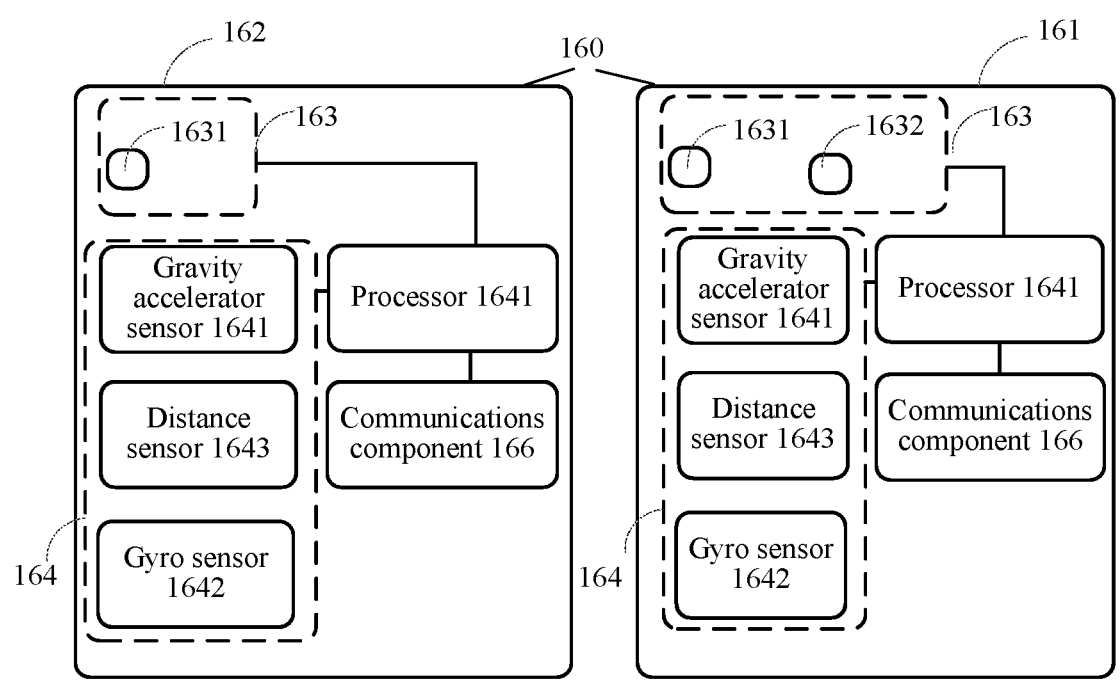
FIG. 1B is a schematic structural diagram of an input device for a VR scene according to an embodiment of this application.

Referring to FIG. 1B, the input device 160 operated with the both hands of the user generally includes a pair of VR handles 161 and 162. In a real environment, a left hand and a right hand respectively operate one of the pair of VR handles, for example, the left hand operates the VR handle 161, and the right hand operates the VR handle 162. The VR handle 161 or 162 is provided with a physical key 163 and a motion sensor 164. Generally, the motion sensor 164 is disposed in the VR handle.

The physical key 163 receives an operation instruction triggered by the user. A position at which the physical key 163 is disposed on each VR handle is determined according to a position of a finger when the user holds the VR handle. For example, in FIG. 1B, a physical key 1631 is disposed at a position of a thumb of the right hand of the user, and a physical key 1632 is disposed at a position of an index finger.

In an embodiment, a plurality of physical keys 163 may be disposed in a function area of the same finger. For example, three physical keys 163 are disposed in a function area of the thumb. The three physical keys 163 are all operated by the thumb. Alternatively, one physical key 163 may be disposed in function areas of a plurality of fingers. For example, one physical key 163 is disposed in function areas of a ring finger and a little finger. The physical key 163 may be controlled by the ring finger or may be controlled by the little finger. A quantity of physical keys disposed on each VR handle is not limited in this application.

In an embodiment, the physical key 163 implements at least one of a selection function, a menu bar view function, and a pressure detection function. Each function may be implemented by one physical key or may be implemented by a plurality of physical keys.

For example, the VR handle 161 is provided with a joystick, a trigger key, a menu bar key, and a pressure detection key. When the menu bar key is pressed, various services provided by a VR system are displayed (the menu bar view function is implemented), for example, various game options or various movie options. When the trigger key is pressed, a game selected by the user is displayed (the selection function is implemented by using a single physical key), for example, for playing of table tennis, a virtual environment for playing table tennis is displayed. In the virtual environment, when the joystick and the trigger key are simultaneously pressed, a virtual hand selects virtual table tennis in the virtual environment (the selection function is implemented by using two physical keys). When the pressure detection key is pressed, strength of the virtual hand grabbing the virtual table tennis is adjusted according to pressure data detected by the pressure detection key (the pressure detection function is implemented).

It is noted that the physical key 163 may implement another function, for example, a system key configured to implement a function of starting and/or turning off the input device 160, or a holding key configured to implement a function of detecting whether the user is holding the input device 160. Enumeration is not performed herein in this embodiment.

In an embodiment, functions of physical keys 163 disposed on different VR handles may be the same or different. This is not limited in this application. For example, the physical key 1632 configured to implement the selection function is disposed on the VR handle 161, while the physical key 1632 is not disposed on the VR handle 162.

In an embodiment, some or all of the physical keys 163 may be implemented as virtual keys implemented by using a touchscreen. This is not limited in this application.

In an embodiment, when the input device 160 is a somatosensory glove, the function implemented by the physical key 163 may be implemented by a physical key disposed on the somatosensory glove, or may be implemented by operating the somatosensory glove to form a preset function gesture. This is not limited in this application.

The motion sensor 164 may acquire a spatial posture of the input device 160. The motion sensor 164 may be any one of a gravity accelerator sensor 1641, a gyro sensor 1642, or a distance sensor 1643.

As one type of motion sensor 164, the gravity accelerator sensor 1641 may detect magnitude of acceleration in various directions (usually on three axes), and may detect magnitude and a direction of the gravity when static. In this way, the VR host 140 can determine a posture, a movement direction, and a movement distance of a real hand of the user according to data output by the gravity accelerator sensor 1641, so that the head mounted display 120 moves the virtual hand in the displayed virtual environment according to the movement direction and the movement distance that are determined by the VR host 140.

The gyro sensor 1642 may detect magnitude of angular velocities in various directions, and detect rotation movement of the input device 160. In this way, the VR host 140 can determine a rotation direction and a rotation angle of the real hand of the user according to data output by the gyro sensor, so that the head mounted display 120 rotates the virtual hand in the displayed virtual environment according to the rotation direction and the rotation angle that are determined by the VR host 140. In an embodiment, the VR host 140 may determine, according to data output by the gyro sensor, a rotation direction and a rotation angle of a virtual article selected by the virtual hand.

The distance sensor 1643 may determine a distance between a finger of the user and the input device 160. In this way, the VR host 140 can determine a gesture object of the user according to data output by the distance sensor 1643, so that the head mounted display 120 displays a gesture object of the virtual hand in the displayed virtual environment according to the gesture object determined by the VR host 140. For example, if the VR host 140 determines, according to the distance sensor, that the gesture object of the user is "thumbs up", the head mounted display 120 also displays the gesture object of the virtual hand as "thumbs up".

In an embodiment, there may be one or more motion sensors 164 of the foregoing types. This is not limited in this application.

The gesture object is a display object for presenting a posture shape of the virtual hand. In different gesture objects, at least one finger shape and/or palm shape is different. The VR host 140 sets a skeleton of a hand in a complete network model, and creates a predefined posture animation of the virtual hand through the skeleton. The posture animation of the virtual hand may be a posture animation in a 2D form that is created according to a 3D network model, or may be a posture animation in a 3D form that is created according to a 3D network model, or may be a posture animation in a 2D form that is created according to a 2D hand model. This is not limited in this application.

In an embodiment, the gesture object includes a frame of fixed (still) posture animation, or may include a plurality of frames of posture animations with dynamic effects.

In an embodiment, the input device 160 may further include other components, such as a processor 165 configured to control each component, and a communications component 166 configured to communicate with the VR host 140. This is not limited in this application.

Figure 2:
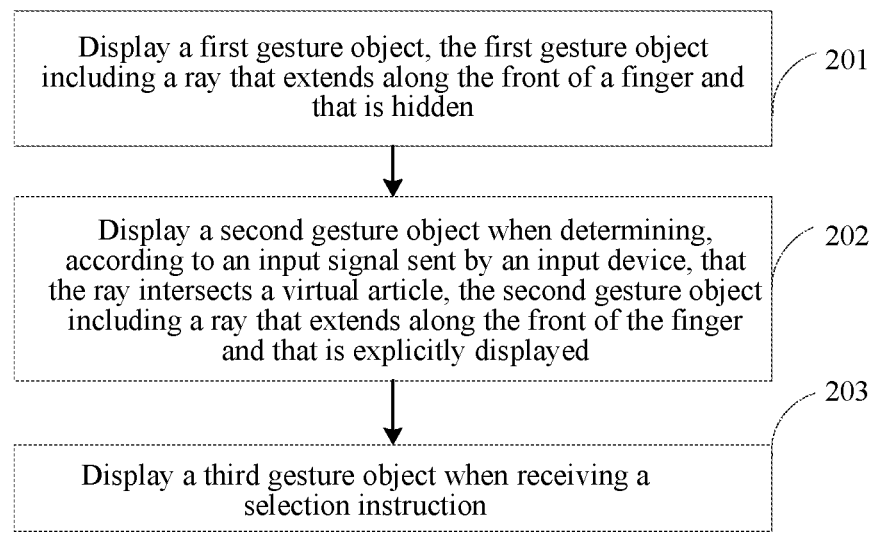
FIG. 2 is a flowchart of a gesture display method for a VR scene according to an embodiment of this application.

FIG. 2 is a flowchart of a gesture display method for a VR scene according to an embodiment of this application. In this embodiment, an example in which the gesture display method for a VR scene is applied to the VR system shown in FIG. 1 is used for description. The method may include the following steps:

Step 201: Display a first gesture object. The first gesture object can include a ray that extends along the front of a finger of a virtual hand and that is hidden.

The first gesture object is a posture animation of the virtual hand in an idle state, that is, a posture animation when the virtual hand does not hold the virtual article, or the virtual hand does not indicate a virtual article to be held.

Figure 3:
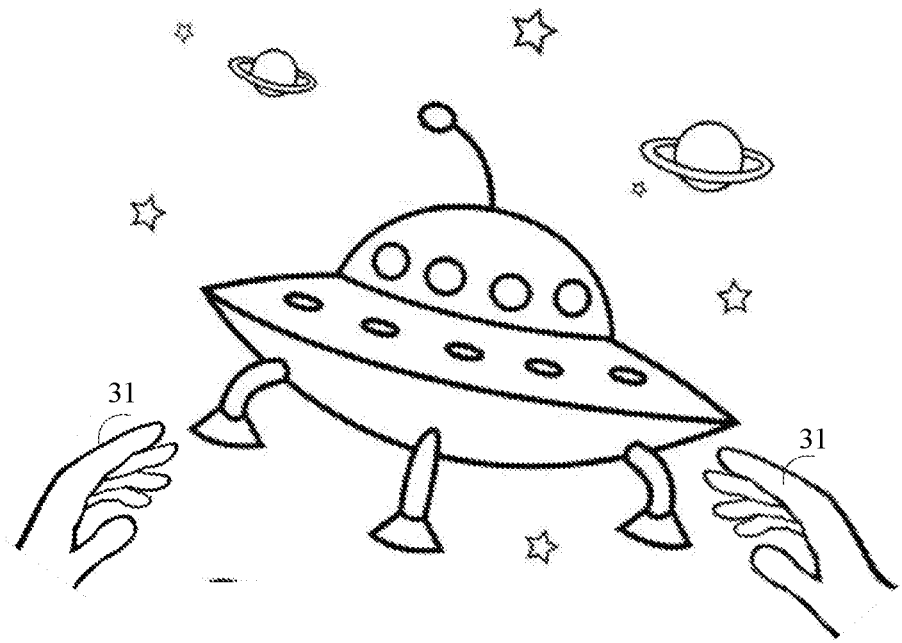
FIG. 3 is a schematic diagram of a first gesture object in a VR scene according to an embodiment of this application.

In an embodiment, the first gesture object is indicated by a posture animation with five fingers spreading out and each finger slightly curling naturally, or indicated by a posture animation with a clenched fist. A specific posture animation of the first gesture object is not limited in this application. Assuming that the first gesture object is shown by 31 in FIG. 3, it can be learned according to FIG. 3 that, the first gesture object 31 is a posture animation with five fingers of the virtual hand spreading out and each finger slightly curling naturally.

In this embodiment, the ray that is emitted along the front of the finger and that is hidden is used for indicating a virtual article indicated by the virtual hand in the virtual scene.

The finger emitting the ray may be any finger of either virtual hand in the virtual scene. This is not limited in this application. For example, the finger emitting the ray is an index finger of a virtual right hand. In an embodiment, a ray may be emitted along the front of a finger of each of both virtual hands, or a ray may be emitted along the front of a finger of the virtual right hand, or a ray may be emitted along the front of each of a plurality of fingers of both virtual hands. This is not limited in this application.

A virtual article is an article that can interact with the virtual hand in a virtual environment. The virtual article is usually a virtual article that can be picked up, held, and put down by the virtual hand, such as a virtual weapon, a virtual fruit, or virtual tableware.

"Hidden" means that the ray logically exists, but is not displayed to a user through a head mounted display.

In an embodiment, the ray is explicitly displayed when the first gesture object is displayed.

Step 202: Display a second gesture object when determining, according to an input signal sent by an input device, that the ray intersects a virtual article. The second gesture object can include a ray that extends along the front of the finger of the virtual hand and that is explicitly displayed.

After displaying the first gesture object through the head mounted display, a VR host may detect, according to the input signal sent by the input device, whether the ray intersects the virtual article. When the ray is detected to intersect the virtual article, it indicates that a virtual article that can interact with the virtual hand exists in the front of the first gesture object, so the second gesture object is displayed. When the ray is detected not to intersect the virtual article, it indicates that no virtual article that can interact with the virtual hand exists in the front of the first gesture object, so the first gesture object remains unchanged, and the input signal sent by the input device continues to be received.

In an embodiment, the VR host detects, when receiving the input signal sent by the input device, whether the ray intersects the virtual article; or the VR host detects, at a predetermined time interval, whether the ray intersects the virtual article, where the predetermined time interval is longer than a time interval at which the input device sends the input signal. An occasion at which the VR host detects whether the ray intersects the virtual article is not limited in this application.

The detecting, by the VR host, whether the ray intersects the virtual article may receive, by the VR host, the input signal sent by the input device and determine a gesture position of the first gesture object in the virtual environment according to the input signal. The detecting whether the ray intersects the virtual article may determine a position of the ray in the virtual environment according to the gesture position and detect whether the ray position overlaps an article position of the virtual article in the virtual environment. The detecting whether the ray intersects the virtual article may determine, when the ray position overlaps the article position, that the ray intersects the virtual article.

The input signal is a signal acquired according to a motion status of a real hand corresponding to the first gesture object in the real environment. For example, the input signal is a sensor signal acquired by a motion sensor in a VR handle. The input signal is used for indicating at least one piece of data of a movement direction, a movement distance, a rotational angular velocity, and a rotation direction of the real hand, and a distance between each finger of the real hand and the input device.

The gesture position is a coordinate set corresponding to the virtual hand in the virtual environment. The ray position is a coordinate set corresponding to the hidden ray in the virtual environment. An article coordinate set is a coordinate set corresponding to the virtual article in the virtual environment.

In an embodiment, when the virtual environment is a 3D environment, the coordinate set is a 3D coordinate set; or when the virtual environment is a 2D environment, the coordinate set is a 2D coordinate set.

The detecting whether the ray position overlaps an article position of the virtual article in the virtual environment is to detect whether there is an intersection set of the coordinate set corresponding to the ray position and the coordinate set corresponding to the article position.

The second gesture object is a posture animation when the virtual hand indicates a virtual article.

Figure 4:
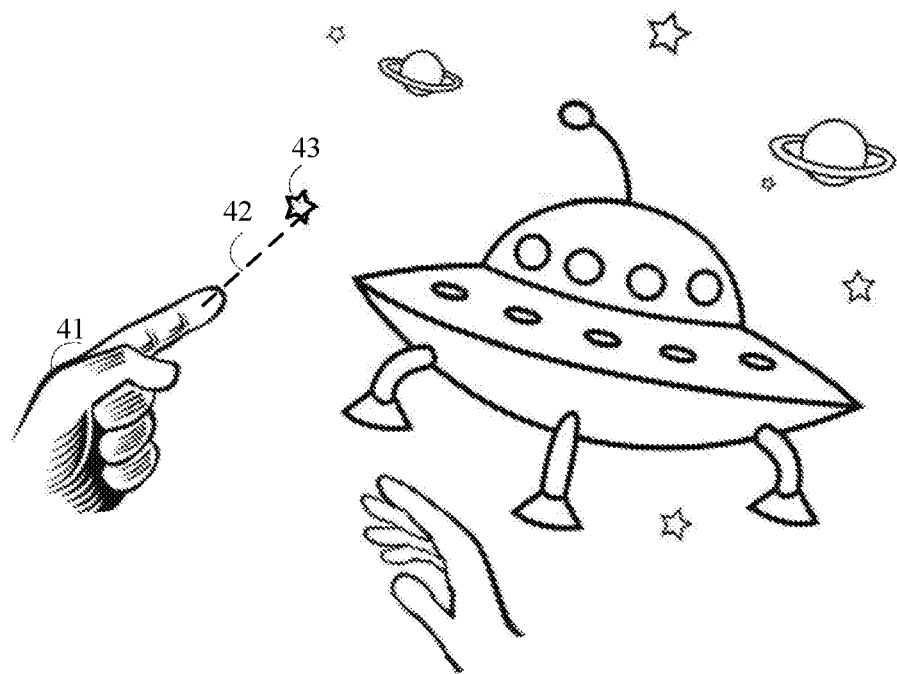
FIG. 4 is a schematic diagram of a second gesture object and a virtual article in a VR scene according to an embodiment of this application.

In an embodiment, the second gesture object may be indicated by a posture animation with an index finger uncurling and a clenched fist with other fingers, or may be indicated by a posture animation (a gun-shaped gesture) with an index finger and a thumb uncurling and a clenched fist with other fingers. A specific posture animation of the second gesture object is not limited in this application. Assuming that the second gesture object is shown by 41 in FIG. 4, it can be learned from FIG. 4 that, the second gesture object 41 is a posture animation with the index finger of the virtual hand uncurling and a clenched fist with other fingers.

The second gesture object includes the ray that extends along the front of the finger and that is explicitly displayed. The ray that is explicitly displayed is a ray that extends along the front of the finger and that is display in a manner visible to the user, when the head mounted display displays the second gesture object.

In an embodiment, the explicitly displayed ray extending from the finger of the second gesture object may be an explicit display form of the ray that extends along the front of the finger and that is hidden in the first gesture object, that is, the ray in the second gesture object and the ray in the first gesture object are the same ray; or the ray in the second gesture object may be regenerated by the VR host. This is not limited in this application.

In an embodiment, the finger from which the ray extends in the second gesture object is the same as the finger from which the ray extends in the first gesture object.

In an embodiment, the extending ray in the second gesture object also intersects the virtual article. For example, in FIG. 4, an extending ray 42 in the second gesture object 41 intersects a virtual article 43.

In an embodiment, when the ray intersects the virtual article, the head mounted display switches the first gesture object to the second gesture object, and displays the virtual article in a preset display manner. The preset display manner is different from an original display manner of the virtual article. That is, the preset display manner is different from the original display manner, and is used for highlighting the virtual article. The preset display manner may enlarge the original display, display with a predetermined color, display with a contour line in a predetermined form, or the like. This is not limited in this application. For example, in FIG. 4, the virtual article 43 is displayed with a bold contour line.

In an embodiment, when the head mounted display displays the second gesture object, the ray extending along the front of the finger may be hidden. This is not limited in this application.

In an embodiment, a length of the ray may be an infinite length, 10 meters, two meters, one meter, or another length. The length of the ray is configurable.

Step 203: Display a third gesture object when receiving a selection instruction.

The selection instruction is generated by the input device according to a received selection operation triggered by the user. The selection operation may be an operation triggered by the user on a physical key and/or a virtual key disposed on the input device, or may be an operation of entering a voice message by the user, or may be an operation triggered by finger curling data acquired by a somatosensory glove. This is not limited in this application.

The third gesture object is a gesture object holding the virtual article. In an embodiment, the third gesture object does not include a ray extending along the front of the finger.

Figure 5:
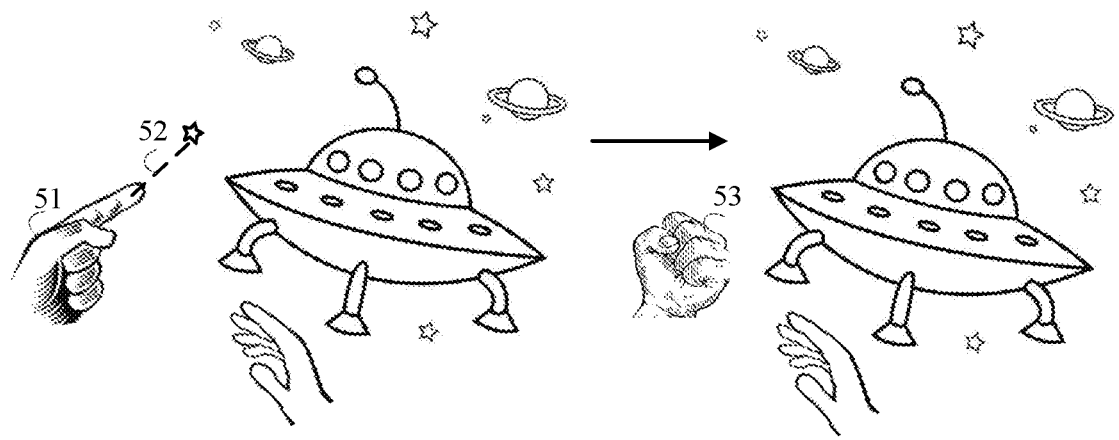
FIG. 5 is a schematic diagram of switching a second gesture object in a VR scene to a third gesture object according to an embodiment of this application.

Referring to FIG. 5, assuming that the VR host displays a second gesture object 51 before receiving the selection instruction, where an extending ray 52 in the second gesture object 51 intersects a virtual article "star", when the selection instruction is received, a third gesture object 53 holding the "star" is displayed.

In an embodiment, the third gesture object reflects the posture animation when the virtual hand grabs the virtual article. However, it is noted that, for articles with different shapes, gestures of the user grabbing the articles may be different, for example, if an article grabbed by the user is a handgun model, a gesture of the user grabbing the handgun model is a gun holding gesture; for another example, if an article grabbed by the user is a pen, a gesture of the user grabbing the pen is a pen holding gesture. Therefore, in the virtual scene, the head mounted display displays, according to a type of the virtual article, a third gesture object corresponding to the virtual article of the type.

Figure 6:
FIG. 6 is a schematic diagram of a third gesture object in a VR scene according to an embodiment of this application.

It is assumed that when the VR host recognizes that the virtual article is a virtual article of a ball type, a third gesture object displayed by the head mounted display and corresponding to the ball type is shown by 61 in FIG. 6. It can be learned according to FIG. 6 that, the third gesture object 61 is a posture animation with five fingers curling along a ball wall.

Figure 7:
FIG. 7 is a schematic diagram of a third gesture object in a VR scene according to an embodiment of this application.

When the VR host recognizes that the virtual article is a virtual article of a gun type, a third gesture object displayed by the head mounted display and corresponding to gun type is shown by 71 in FIG. 7. It can be learned according to FIG.

7 that, the third gesture object 71 is a posture animation with the index finger hooking a trigger and the other fingers holding a gun body.

Figure 8:
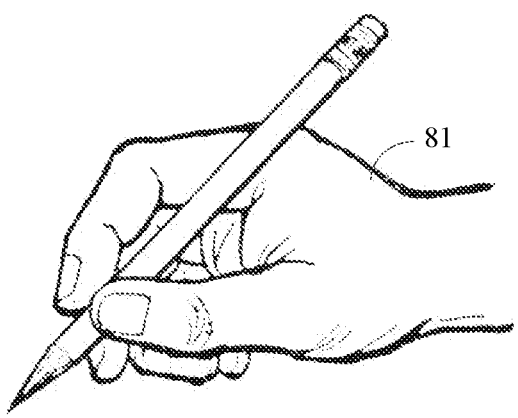
FIG. 8 is a schematic diagram of a third gesture object in a VR scene according to an embodiment of this application.

When the VR host recognizes that the virtual article is a virtual article of a pen type, a third gesture object displayed by the head mounted display and corresponding to the pen type is shown by 81 in FIG. 8. It can be learned according to FIG. 8 that, the third gesture object 81 is a posture animation with the index finger, the thumb, and a middle finger holding a pen tube and other fingers curling.

Figure 9:
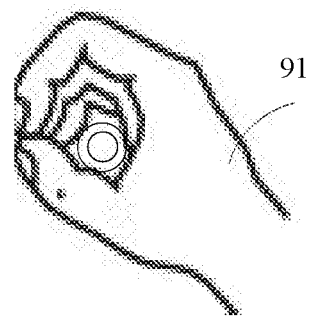
FIG. 9 is a schematic diagram of a third gesture object in a VR scene according to an embodiment of this application.

When the VR host recognizes that the virtual article is a virtual article of a rod type, a third gesture object displayed by the head mounted display and corresponding to the rod type is shown by 91 in FIG. 9. It can be learned according to FIG. 9 that, the third gesture object 91 is a posture animation with fingers curling around the virtual article.

It is noted that the third gesture object may alternatively be a posture animation corresponding to a virtual article of another type. Enumeration is not performed herein in this application.

In conclusion, according to the gesture display method for a VR scene provided in this application, when a ray in a first gesture object that extends along the front of a finger and that is hidden intersects a virtual article in a virtual environment, a second gesture object is displayed, and a ray in the second gesture object that extends along the front of the finger is displayed, so that a user can learn of a virtual article indicated by the second gesture object; and a third gesture object is displayed when a selection instruction is received, so that the user learns that the virtual article is already grabbed in the virtual environment. Therefore, a problem that in a VR system, a virtual article can be grabbed only through contact between a virtual hand and virtual article, leading to low efficiency of grabbing a virtual article far away can be resolved. Because the virtual hand can grab the virtual article by using the ray that extends along the front of the finger, a function of grabbing the virtual article far away in the VR system can be achieved.

In addition, because the VR host can determine, without sending an operation instruction through the input device, according to whether the ray intersects the virtual article, whether to switch among different gesture objects, so that the gesture display method in this application is applicable to most types of input devices, thereby expanding an application scope of the gesture display method.

In addition, when the ray intersects the virtual article, the ray is explicitly displayed; and when the first gesture object is displayed, the ray is hidden, to ensure that the user can learn of the virtual article indicated by the second gesture object and save display resources.

In an embodiment, after step 203, the VR host displays the first gesture object through the head mounted display when receiving a placement instruction sent by the input device.

The placement instruction is generated by the input device according to a received placement operation triggered by the user. An operation manner of the placement operation is different from an operation manner of the selection operation. The placement operation may be an operation triggered by the user on a physical key and/or a virtual key disposed on the input device, or may be an operation of entering a voice message by the user. This is not limited in this application.

In a case, the placement instruction is used for instructing the VR host to place the virtual article held in the third gesture object to a position of vertical projection of the virtual article in the virtual environment. That is, a placement process displayed by the head mounted display is a process in which the virtual article falls vertically.

Figure 10:
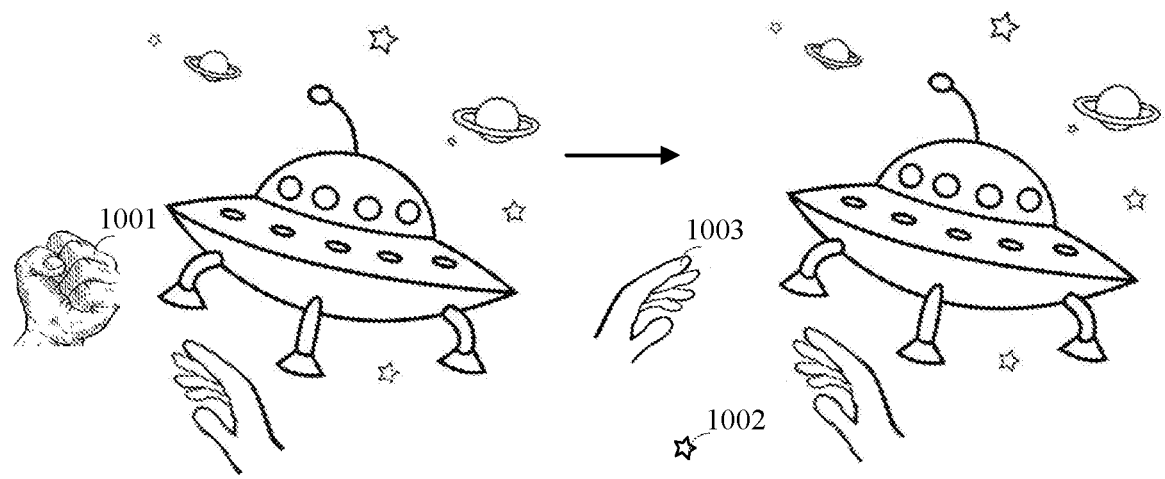
FIG. 10 is a schematic diagram of switching a third gesture object in a VR scene to a first gesture object according to an embodiment of this application.

Referring to FIG. 10, assuming that the VR host displays a third gesture object 1001 before receiving the placement instruction, where a "star" is held in the third gesture object 1001, when the VR host receives the placement instruction, the "star" falls vertically to a position 1002, and a first gesture object 1003 is displayed.

In another case, the placement instruction is used for instructing the VR host to place the virtual article held in the third gesture object to a position of the virtual article before the virtual article is selected. That is, a placement process displayed by the head mounted display is a process in which the virtual article is thrown to an original position.

Figure 11:
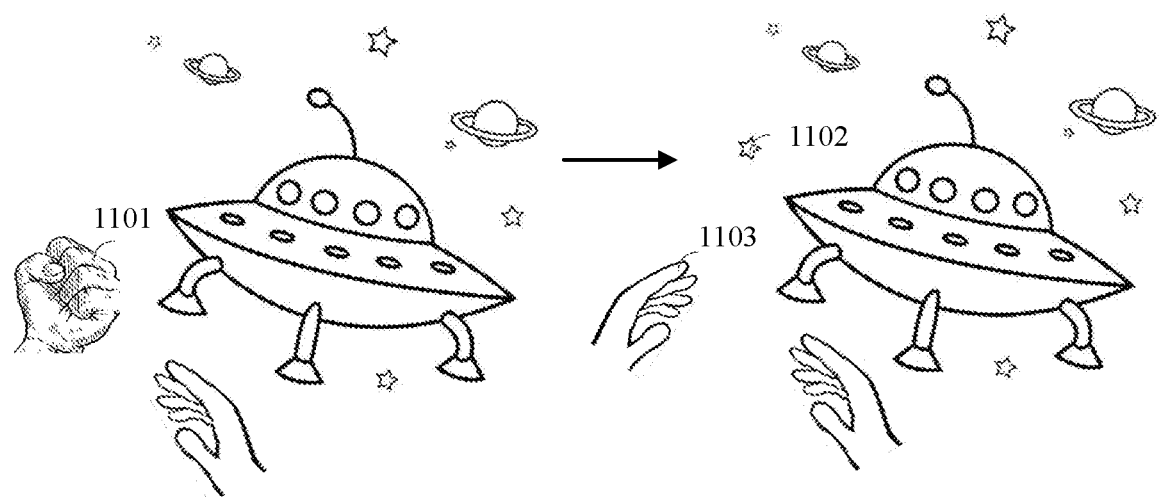
FIG. 11 is a schematic diagram of switching a third gesture object in a VR scene to a first gesture object according to an embodiment of this application.

Referring to FIG. 11, assuming that the VR host displays a third gesture object 1101 before receiving the placement instruction, where a "star" is held in the third gesture object 1001, when the VR host receives the placement instruction, the "star" is thrown to an original position 1102, and a first gesture object 1103 is displayed.

In an embodiment, when the VR system displays the first gesture object, the input device may receive a user operation triggered by the user on a predetermined key. The user operation includes one of a press operation and a release operation. The predetermined key is a physical key or a virtual key disposed on the input device. This is not limited in this application.

When receiving a press operation on the predetermined key, the input device sends, to the VR host, a press instruction that is generated according to the press operation, where the press instruction carries an identifier of the predetermined key. Correspondingly, the VR host displays a fourth gesture object when receiving the press instruction corresponding to the predetermined key, where the fourth gesture object is a posture animation in which a finger corresponding to the predetermined key is in a curled state.

In an embodiment, the VR host pre-stores a fourth gesture object corresponding to an identifier of each predetermined key. In this way, the fourth gesture object corresponding to the identifier of the predetermined key can be determined according to the identifier of the predetermined key in the received press instruction, to display the fourth gesture object.

Figure 12:
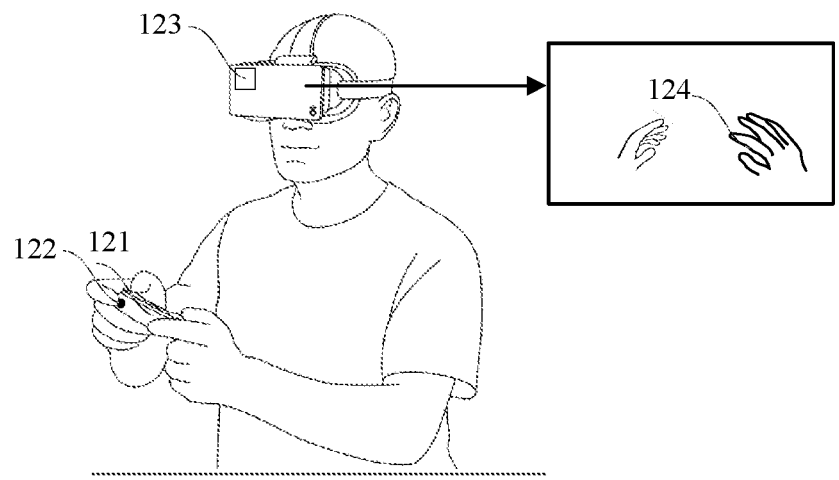
FIG. 12 is a schematic diagram of a fourth gesture object in a VR scene according to an embodiment of this application.

Referring to FIG. 12, assuming that an index finger of the user presses a predetermined key 122 on an input device 121 that corresponds to a position of the index finger, the input device generates a press instruction, and sends the press instruction to a VR host 123, where the press instruction carries an identifier of the predetermined key 122. After receiving the press instruction corresponding to the predetermined key 122, the VR host 123 displays, through the head mounted display, a fourth gesture object 124 corresponding to the identifier of the predetermined key 122.

After the head mounted display displays the fourth gesture object, when receiving a release operation on the predetermined key, the input device sends, to the VR host, a release instruction that is generated according to the release operation, where the release instruction carries the identifier of the predetermined key. Correspondingly, when receiving the release instruction corresponding to the predetermined key, the VR host displays a fifth gesture object, where the fifth gesture object is a gesture object of the finger corresponding to the predetermined key in a spread state.

In an embodiment, the VR host pre-stores a fifth gesture object corresponding to an identifier of each predetermined key. In this way, the fifth gesture object corresponding to the predetermined key can be determined according to the identifier of the predetermined key in the received press instruction, to display the fifth gesture object.

Figure 13:
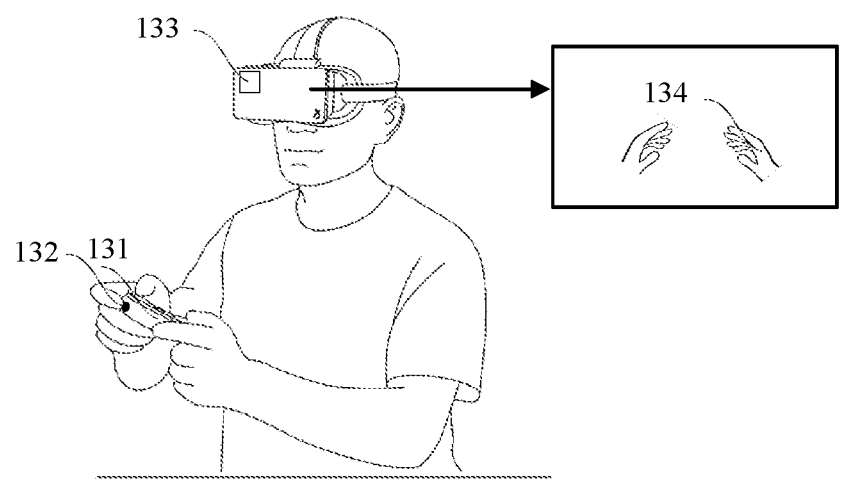
FIG. 13 is a schematic diagram of a fifth gesture object in a VR scene according to an embodiment of this application.

Referring to FIG. 13, assuming that the index finger of the user presses a predetermined key 132 on an input device 131 that corresponds to a position of the index finger, and the predetermined key 132 is released, the input device generates a release instruction, and sends the release instruction to a VR host 133, where the release instruction carries an identifier of the predetermined key 132. After receiving the release instruction corresponding to the predetermined key 132, the VR host 133 displays, through the head mounted display, a fifth gesture object 134 corresponding to the identifier of the predetermined key 132.

In an embodiment, the fifth gesture object may be the same as the first gesture object, or may be different from the first gesture object. This is not limited in this application.

In an embodiment, after step 201, the VR host may detect, according to the input signal sent by the input device, whether the first gesture object intersects the virtual article. When the first gesture is detected to intersect the virtual article, it indicates that the first gesture object comes into contact with the virtual article that can interact with the virtual hand. In this case, the VR host controls the head mounted display to directly display the third gesture object, without performing the process of displaying the second gesture object. When the first gesture is detected not to intersect the virtual article, it indicates that the first gesture object does not come into contact with the virtual article that can interact with the virtual hand. In this case, the first gesture object remains unchanged, and the input signal sent by the input device continues to be received; or step 202 is performed.

In an embodiment, when receiving the input signal sent by the input device, the VR host detects whether the first gesture object intersects with the virtual article; or the VR host detects, at a predetermined time interval, whether the first gesture object intersects with the virtual article, where the predetermined time interval is longer than a time interval at which the input device sends the input signal. An occasion at which the VR host detects whether the first gesture object intersects the virtual article is not limited in this application.

The detecting, by the VR host, whether the first gesture object intersects the virtual article may receive the input signal sent by the input device, where the input signal is a signal acquired according to a motion status of a real hand corresponding to the first gesture object in a real environment. The detecting whether the first gesture object intersects the virtual article may determine a gesture position of the first gesture object in a virtual environment according to the input signal and detect whether the gesture position overlaps an article position of the virtual article in the virtual environment. The detecting whether the first gesture object intersects the virtual article may determine, when the gesture position overlaps the article position, that the first gesture object intersects the virtual article.

Related descriptions of the input signal, the gesture position, the ray position, and an article coordinate set are the same as descriptions in step 202, and details are not described herein again in this application.

The detecting whether the gesture position overlaps an article position of the virtual article in the virtual environment may detect whether there is an intersection set of a coordinate set corresponding to the gesture position and a coordinate set corresponding to the article position.

Figure 14:
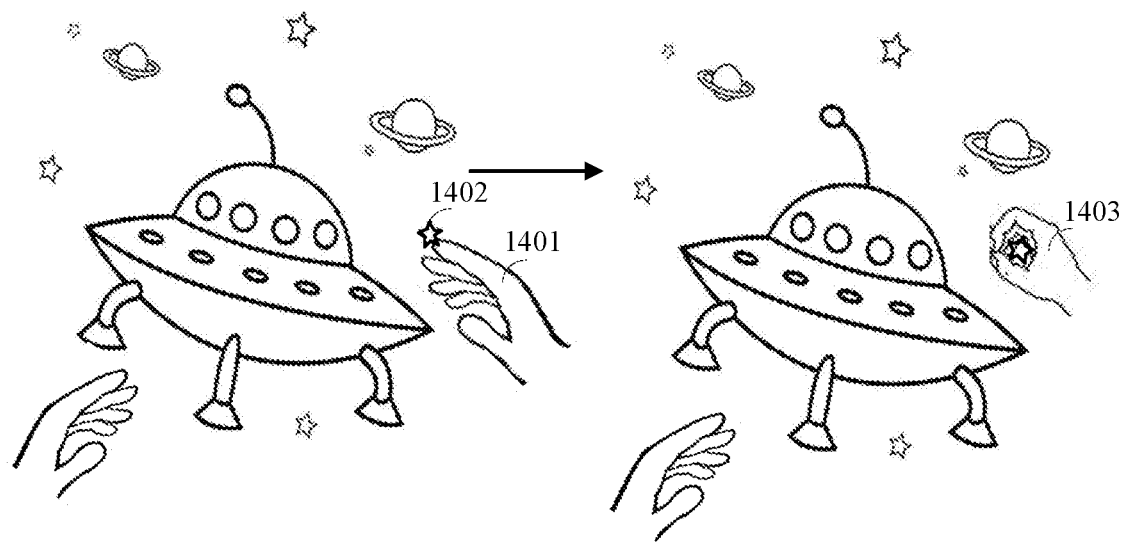
FIG. 14 is a schematic diagram of switching a first gesture object in a VR scene to a third gesture object according to an embodiment of this application.

Referring to FIG. 14, assuming that a first gesture object 1401 comes into contact with a virtual article 1402, the head mounted display displays a third gesture object 1403.

It can be learned with an embodiment that, from a moment at which the VR system is powered on and displays the first gesture object, there are three types of gesture object switching logic, which are respectively as follows: in the first gesture object switching logic, when the virtual hand in the virtual environment comes into contact with the virtual article, the first gesture object is switched to the third gesture object; in the second gesture object switching logic, when the ray in the virtual environment intersects the virtual article, the first gesture object is switched to the second gesture object; and in the third gesture object switching logic, when the virtual hand in the virtual environment does not come into contact with the virtual article, and the ray does not intersect the virtual article, the first gesture object remains unchanged. Subsequently, before displaying the virtual hand in the virtual environment in each frame, the head mounted display can determine, through the VR host, whether to switch a gesture object.

In an embodiment, determining priorities for the three types of switching logic are pre-stored in the VR host, and whether to switch a gesture object is sequentially determined according to a descending order of priorities. A manner of setting the priority is not limited in this application.

Figure 15:
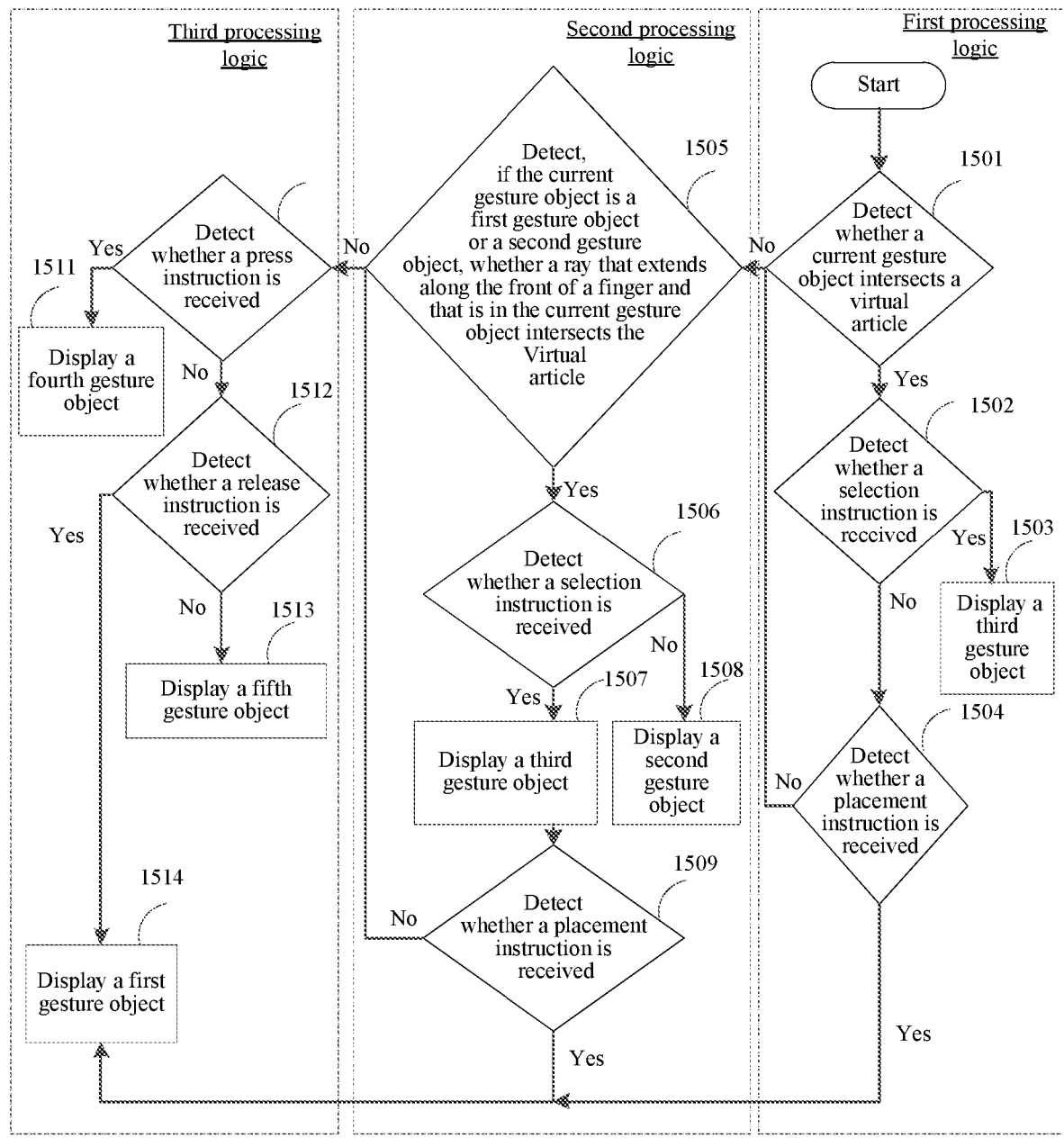
FIG. 15 is a flowchart of a gesture display method for a VR scene according to another embodiment of this application.

FIG. 15 is a flowchart of a gesture display method for a VR scene according to another embodiment of this application. In this embodiment, an example in which the gesture display method for a VR scene is applied to the VR system shown in FIG. 1 is used for description. Assuming that preset priorities in a VR host are that: the first switching logic is higher than the second switching logic and the second switching logic is higher than the third switching logic. After step 201, the method further includes the following several steps:

Step 1501: Detect whether a current gesture object intersects a virtual article. If yes, perform step 1502; or if not, perform step 1505.

The VR host detects whether there is an intersection set of coordinates of the current gesture object in 3D virtual space and coordinates of the virtual article in the 3D virtual space. If yes, it indicates that the current gesture object intersects the virtual article; or if not, it indicates that the current gesture object does not intersect the virtual article.

The current gesture object may be a default first gesture object, or may be a gesture object in a virtual environment in a previous frame. This is not limited in this application.

Step 1502: Detect whether a selection instruction is received. If yes, perform step 1503; or if not, perform step 1504.

Step 1503: Display a third gesture object.

Step 1504: Detect whether a placement instruction is received. If yes, perform step 1514; or if not, perform step 1505.

Step 1505: Detect, if the current gesture object is a first gesture object or a second gesture object, whether a ray that extends along the front of a finger and that is in the current gesture object intersects the virtual article. If yes, perform step 1506; or if not, perform step 1510.

If the VR host detects whether there is an intersection set of coordinates of a ray in the first gesture object or the second gesture object in the 3D virtual space and the coordinates of the virtual article in the 3D virtual space. If yes, it indicates that the ray that extends along the front of the finger and that is in the current gesture object intersects the virtual article; or if not, it indicates that the ray that extends along the front of the finger and that is in the current gesture object does not intersect the virtual article.

If the current gesture object is the first gesture object, the ray is hidden; or if the current gesture object is the second gesture object, the ray is explicitly displayed.

Step 1506: Detect whether a selection instruction is received. If yes, perform step 1507; or if not, perform step 1508.

Step 1507: Display a third gesture object, and step 1509.

Step 1508: Display a second gesture object.

Step 1509: Detect whether a placement instruction is received. If yes, perform step 1514; or if not, perform step 1510.

Step 1510: Detect whether a press instruction is received. If yes, perform step 1511; or if not, perform step 1512.

Step 1511: Display a fourth gesture object.

Step 1512: Detect whether a release instruction is received. If yes, perform step 1514; or if not, perform step 1513.

Step 1513: Display a fifth gesture object.

Step 1514: Display a first gesture object.

In an embodiment, when a head mounted display displays a virtual environment in each frame, the VR host may perform the foregoing steps.

In an embodiment, the head mounted display may directly perform step 1501, without performing step 201. This is not limited in this application.

Figure 16:
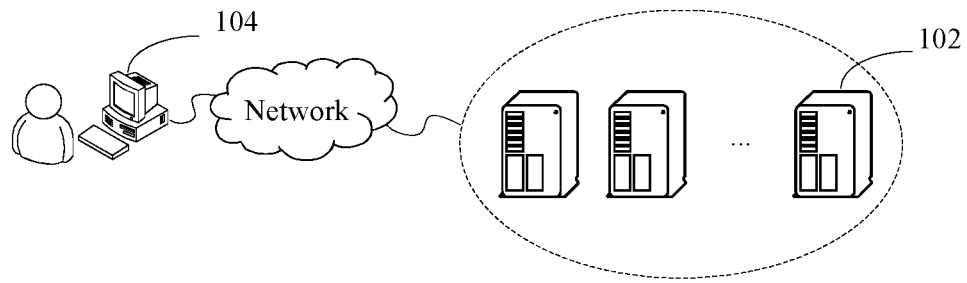
FIG. 16 is a schematic diagram of a hardware environment of an object processing method in a virtual scene according to an embodiment of this application.

In an embodiment, an object processing method in a virtual scene is further provided. The method may be applied to a hardware environment including a server 1602 and a terminal 1604 shown in FIG. 16. As shown in FIG. 16, the server 1602 is connected to the terminal 1604 through a network. The network includes but is not limited to: a wide area network, a metropolitan area network, or a local area network, and the terminal 1604 is not limited to a PC, a mobile phone, a tablet computer, or the like. The object processing method in a virtual scene in this embodiment of this application may be performed by the server 1602, or may be performed by the terminal 1604, or may be performed by both the server 1602 and the terminal 1604. The object processing method in a virtual scene in this embodiment of this application that is performed by the terminal 1604 may be performed by a client installed on the terminal 1604.

In an embodiment, the server 1602 and the terminal 1604 may be collectively referred to as a VR host.

Figure 17:
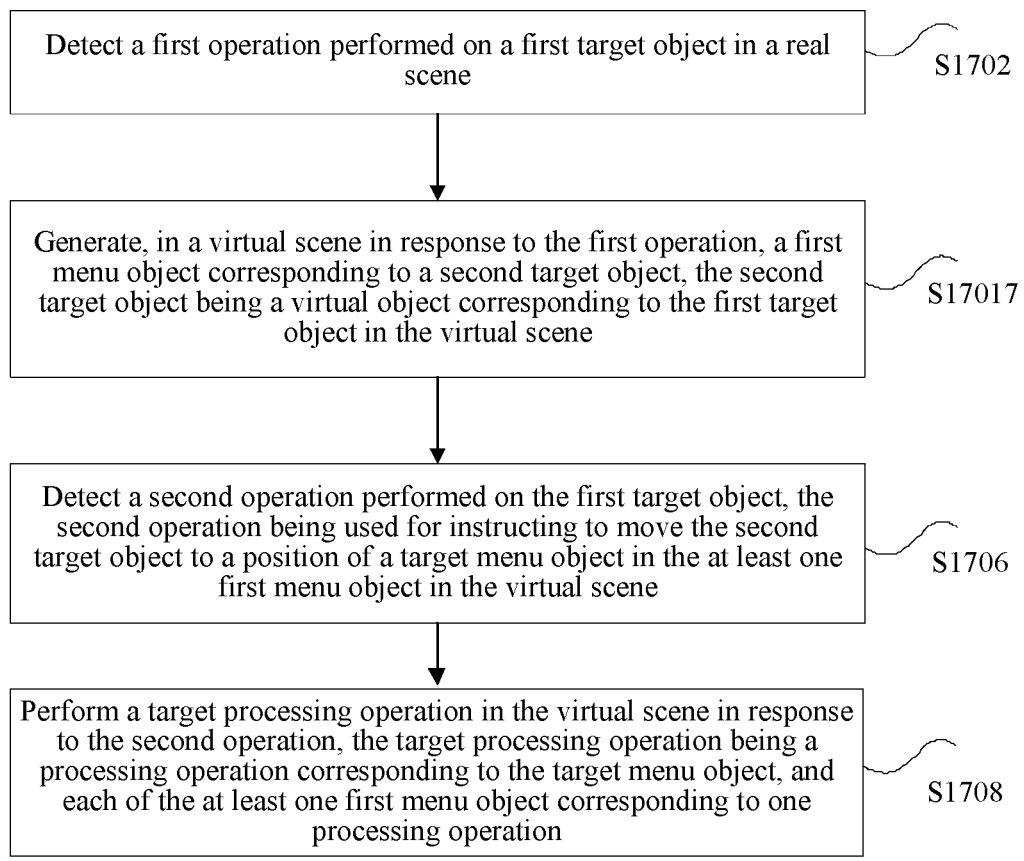
FIG. 17 is a flowchart of an object processing method in a virtual scene according to an embodiment of this application.

FIG. 17 is a flowchart of an optional object processing method in a virtual scene according to an embodiment of this application. As shown in FIG. 17, the method may include the following steps:

Step S1702: Detect a first operation performed on a first target object in a real scene.

Step S1704: Generate, in response to the first operation, at least one first menu object corresponding to a second target object in a virtual scene. The second target object is a virtual object in the virtual scene that corresponds to the first target object.

Step S1706: Detect a second operation performed on the first target object. The second operation is used for instructing to move the second target object to a position of a target menu object in the at least one first menu object in the virtual scene.

Step S1708: Perform a target processing operation in the virtual scene in response to the second operation. The target processing operation is a processing operation corresponding to the target menu object, and each of the at least one first menu object corresponds to one processing operation.

According to step S1702 to step S1708, a first operation performed on a first target object is detected; a plurality of first menu objects corresponding to a second target object corresponding to the first target object is generated in a virtual scene according to the detected first operation; a second operation performed on the first target object is detected; and the second target object in the virtual scene is instructed, according to the detected second operation, to move to a position of a target menu object in the first menu object. When the second target object in the virtual scene moves to the position of the target menu object, a target processing operation is performed in the virtual scene, without simulating a mouse, and 3D spatial coordinates are converted in to a 2D spatial position for an operation, to resolve a technical problem in a related technology that a ray is emitted to position a menu option in a 2D menu panel in a virtual scene, leading to a relatively complex menu selection operation in the virtual scene, thereby directly performing an operation by using 3D spatial coordinates, and making the menu selection operation in the more convenient.

In the technical solution provided in step S1702, the first target object may be a device object in a real scene that is used for controlling the virtual scene. For example, the first target object may be a game handle or a remote control in the real scene.

In an embodiment, the first target object may also be referred to as an input device.

In the real scene, a user may perform the first operation on the first target object. The first operation may include, but is not limited to, a tap, a long press, a gesture, a shake, and the like. In this embodiment of this application, the first operation performed by the user on the first target object in the real scene may be detected to obtain a control instruction corresponding to the first operation. The control instruction may be used for controlling the virtual scene. For example, in a VR game application, the user may press a key on a game handle, to control generation of a menu option in a virtual game picture. Alternatively, in a VR video application, the user may press a key on a remote control to control a playback action in a virtual video picture.

In an embodiment, the first operation performed on the first target object in the real scene is detected in real time. In this way, a response can be made to the first operation in a timely and fast manner, so that a more timely processing operation can be performed on an object in the virtual scene, thereby improving experience of using the virtual scene by the user.

In an embodiment, the first operation performed on the first target object in the real scene may be detected at an interval. In this way, processing resources of the VR host can be saved.

In the technical solution provided in step S1704, the second target object may be a virtual object in the virtual scene that corresponds to the first target object in the real scene.

For example, assuming that the first target object is a game handle in the real scene, the second target object may be a game handle in the virtual scene. A position, in the virtual scene, of the game handle in the virtual scene may correspond to a position, in the real scene, of the game handle in the real scene. For example, when the user controls the game handle in the real scene to move, the game handle in the virtual scene also moves, and a movement direction and a movement distance are the same as a movement direction and a movement distance of the game handle in the real scene.

For another example, assuming that the first target object is a game handle in the real scene, the second target object may be a virtual hand in the virtual scene. A position, in the virtual scene, of the virtual hand in the virtual scene may correspond to a position, in the real scene, of the game handle in the real scene. For example, when the user controls the game handle in the real scene to move, the virtual hand in the virtual scene also moves, and a movement direction and a movement distance are the same as a movement direction and a movement distance of the game handle in the real scene.

When the user performs the first operation on the first target object, in an embodiment, a response may be made to the first operation. A response process may include generating at least one first menu object corresponding to the second target object in the virtual scene, where the first menu object may be a virtual menu used for controlling the virtual scene. For example, after the user presses a menu control key on the game handle in the real scene, an operation of pressing a menu control key is also correspondingly performed on the game handle in the virtual scene, and then, a menu may be generated in the virtual scene through a response operation in the virtual scene, for the user to select a menu object, to implement a function corresponding to the menu object.

It is noted that, a function corresponding to the first menu object is not specifically limited in this embodiment of this application. For the first menu object, a drop-down list may be generated, an action may be correspondingly performed, a task may be completed, or the like.

In an embodiment, step S1704 of generating, in response to the first operation, at least one first menu object corresponding to a second target object in a virtual scene may include the following steps:

Step S17042: Obtain a current target scene in the virtual scene when detecting the first operation.

Step S17044: Generate, around the second target object in the virtual scene according to a predetermined correspondence between a virtual scene and a menu object, the at least one first menu object corresponding to the target scene.

According to an embodiment of this application, when the first operation is detected, a process of making a response to the first operation may include obtaining a current target scene in the virtual scene when the first operation is received, and then determining, according to a predetermined correspondence between a target scene and a menu object, a menu object corresponding to the target scene. That is, when the first operation is detected, the virtual scene is the current target scene, and it is determined, according to the predetermined relationship, that the menu object corresponding to the target scene is the first menu object, so that the first menu object corresponding to the target scene may be generated around the second target object in the virtual scene, for selection by the user, and the user can select a corresponding menu option according to the generated first menu object.

In an embodiment, in different target scenes, menu objects corresponding to the different target scenes may be generated. For example, in a shooting game, a generated corresponding menu object may be a weaponry selection menu; or in a fighting game, a generated corresponding menu object may be a skill selection menu. Menu objects corresponding to other target scenes are not described herein one by one by using examples.

In an embodiment, an arrangement manner of the at least one first menu object generated around the second target object in the virtual scene in response to the first operation is not specifically limited in this application. The arrangement manner of the first menu object around the second target object may include at least one of the following:

(1) generating the at least one first menu object at predetermined circumference with a predetermined gap, where the predetermined circumference may be circumference formed by using a position of the second target object as a circle center and a predetermined distance as a radius; and the predetermined distance and the predetermined gap herein may be set according to an actual requirement, and this is not specifically limited herein; and (2) generating the at least one first menu object in a predetermined arrangement order in a predetermined direction of the second target object, where the predetermined direction includes at least one of the following: above, below, left, right, and the like, and the predetermined arrangement order includes at least one of the following: a linear arrangement order, a curved arrangement order, and the like.

It is noted that, although some arrangement manners are listed above in this application, another arrangement manner such as a random arrangement manner, may also be used. Examples are not used herein for description one by one.

According to an embodiment of this application, in response to the first operation, a plurality of first menu objects may be evenly arranged around the second target object at the predetermined circumference by using the second target object as a center in the virtual scene. A predetermined distance between each first menu object and the second target object is used as a radius of the predetermined circumference, and every two adjacent first menu objects are arranged at a predetermined gap. Alternatively, the first menu object may be arranged above, below, on the left of, on the right of, or in another direction of the second target object in a form of a straight line or a form of a curve. In the solution, the plurality of first menu objects is arranged around the second target object, when the user observes the second target object, the second target object can be conveniently controlled to move to a direction of a first menu object needing to be selected, to complete selection of a menu object.

In an embodiment, the first menu objects may be arranged around the second target object in a pattern of a 3D ball; the first menu objects may be arranged around the second target object in a pattern of a 3D block; or the first menu objects may be arranged around the second target object in another different pattern. Examples are not used herein one by one for description.

In an embodiment, the first menu objects may be arranged around the second target object in a circumference form, or may be arranged in another form. Examples are not used herein one by one for description either.

In the technical solution provided in step S1706, after a response is made to the first operation performed on the first target object, in an embodiment, the second operation performed by the user on the first target object in the real scene may be further detected in real time. The second operation may include, but is not limited to, a moving operation, a sliding operation, or the like.

In an embodiment, after a response is made to the first operation performed on the first target object, the second operation performed by the user on the first target object in the real scene may be detected at an interval.

In an embodiment, the second operation may be another operation performed by the user after the user performs the first operation on the game handle. For example, when the first operation is pressing a key on the game handle, the second operation is holding the game handle to move. The second operation may have a plurality of different implementations that are not described in detail herein one by one.

After the second operation performed on the first target object is detected, in an embodiment, a response may be made to the second operation, which may specifically include controlling, in the virtual scene, the second target object to move according to a movement direction and a movement distance of the first target object in the real scene, so that the second target object can move to the position of the target menu object in the virtual scene. The target menu object may be any one of the at least one first menu object around the second target object in the virtual scene, and the user may perform the second operation on the first target object, to control the second target object in the virtual scene to move to a target menu object in the plurality of first menu objects under control of the second operation.

For example, when the user needs to select a target menu object, the user holds the game handle in the real scene to move, and the game handle in the virtual scene also moves toward a corresponding direction. The user controls a movement direction of the game handle in the real scene to control a movement direction of the game handle in the virtual scene, so that the game handle in the virtual scene moves to a target menu object needing to be selected, to complete selection of the target menu object.

In the technical solution provided in step S408, in an embodiment, in response to the second operation, the second target object in the virtual scene may be controlled to move to the target menu object, and when the second target object moves to the target menu object, the target processing operation corresponding to the target menu object is triggered. It is noted that, each of the at least one first menu object arranged around the second target object in the virtual scene corresponds to one processing operation, and a processing operation corresponding to the target menu object is the target processing operation. It is further noted that, a processing operation corresponding to the first menu object may include, but is not limited to, generation of a drop-down list object of the first menu object, implementation of a function, or the like.

For example, in a shooting game, that is, the virtual scene is a shooting game environment, in the virtual scene, the user controls a virtual game handle to move to a position of a target menu object for reloading, a response is made to a target processing operation corresponding to a target menu object for reloading selected by the user, and a game character in the virtual scene is controlled to reload, and the target processing operation is performed. It is noted that, there may be a plurality of target processing operations, for example, performing a function corresponding to the menu object or triggering generation of a drop-down list of the menu option. The target processing operation further includes a plurality of implementations that are not described in detail herein one by one by using examples.

In an optional embodiment, step S1708 of performing a target processing operation in the virtual scene in response to the second operation may include at least one of the following:

generating at least one second menu object in the virtual scene, where the at least one second menu object is a drop-down list object of the target menu object;

switching a first scene in the virtual scene to a second scene, for example, switching between game scenes;

setting an attribute of an operation object in the virtual scene to a target attribute, for example, updating a skin, weaponry, and a skill of a game character; and controlling the operation object in the virtual scene to execute a target task, for example, a game character executing a monster killing task.

It is noted that, the target processing operation is not limited in this application, and the target processing operation may further include other operations that are not described herein one by one by using examples. According to an embodiment of this application, the target processing operation is performed in the virtual scene in response to the second operation, and different target processing operations may be selected according to a requirement of the user and functions represented by different first menu objects, so that a menu in the virtual scene can meet a plurality of use requirements.

In an optional embodiment, after the generating, in response to the first operation, at least one first menu object corresponding to a second target object in a virtual scene, this embodiment may further include detecting a third operation performed on the first target object and deleting the at least one first menu object from the virtual scene in response to the third operation.

According to an embodiment of this application, after the first menu object is generated around the second target object in the virtual scene, the user may further control performing of the third operation on the first target object. The third operation may include, but is not limited to, a key releasing operation, a tap operation, a long press operation, a moving operation, or the like. When the third operation performed on the first target object is detected, the third operation may be correspondingly controlled to be performed on the second target object in the virtual scene. Deletion of the first menu object from the virtual scene is canceling display of menu content in the virtual scene.

For example, after a plurality of first menu objects is generated around the game handle in the virtual scene, the user controls performing of the third operation on the game handle in the real scene, for example, pressing a key on the game handle, or shaking a joystick on the game handle, or releasing a key on the game handle, and a corresponding operation is also performed on the game handle in the virtual scene, to delete the plurality of first menu objects from the virtual scene, so that display of menu content is canceled in the virtual scene.

In an optional embodiment, before the performing a target processing operation in the virtual scene in response to the second operation, this embodiment may further include setting a tag for the target menu object in the virtual scene in response to the second operation, where the tag is used for instructing to move the second target object to the position of the target menu object.

According to an embodiment, the tag may be set for the target menu object, so that in a process in which the second target object in the virtual scene moves to the position of the target menu object, the user can clearly see the tag, and can more conveniently perform movement under the guidance of the tag.

For example, the user may control the game handle in the virtual scene to point to a target menu object, so that the target menu object enlarges, shines, flickers, or rotates under the action of the tag. It is noted that, the target menu object has other representation forms under the action of the tag that are not described in detail herein one by one by using examples.

This application further provides an embodiment. This embodiment provides an interaction solution of a hand menu in a VR environment.

An application scenario described in this application is the VR environment. For all games in an environment of a 2D display such as a host game and a mobile phone game, regardless of a game in a 3D or 2D scene, a menu is made by using a 2D interface, because when the 2D display performs a final display, the menu is not used as content in a game scene, but is used as a connection medium for a user and game content. If the menu is made by using the 2D interface, a 2D panel of the menu may directly face a display direction of the display (that is, a camera direction of a player in a virtual world), so that the user can perform selection more fast and conveniently, without affecting game logic in the virtual world, and the menu is relatively independent.

In the VR environment, because an interaction manner of the user and a host is directly obtaining a position of the user in real 3D space, and directly mapping to a 3D position in virtual space according to the position, instead of reversely mapping a change in a position in the 2D interface to 3D space through a mouse or a keyboard to operate the virtual world. In this way, an original correspondence between 2D screen space and 3D virtual space operated through the mouse does not exist.

A 3D manner is used for displaying a menu. The menu may be used as a 3D object in the virtual world to be directly integrated with a scene in the virtual world, so that the user can perform an operation more conveniently and intuitively, and a sense of substitution in a VR game also becomes stronger.

This application mainly describes performance and logic implementation. When the user invokes the menu, each option in the menu is arranged around a hand according to a particular arrangement algorithm, as a 3D object; and then the user triggers a menu option through a predefined behavior. A selected menu option triggers a corresponding function, and the entire menu disappears after the triggering.

This application provides a 3D object menu in the VR environment. When the user invokes the menu, each option in the menu appears around the hand according to a particular arrangement algorithm, as a 3D object; and then the user triggers a menu option through a predefined behavior. A selected menu option triggers a corresponding function, and the entire menu disappears after the triggering.

The hand 3D object menu provided in this application may be used as a shortcut menu in a VR application, and especially in a particular game scene, each menu option may actually exist in the game scene, so that immersion experience of the user in a game is not affected by appearance of the menu, and the user can fast select a corresponding function.

Figure 18:
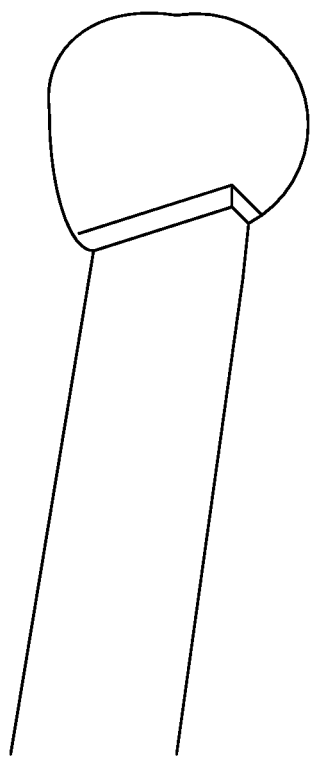
FIG. 18 is a schematic diagram of a hand menu in a VR environment according to an embodiment of this application.

FIG. 18 is a schematic diagram of an optional hand menu in a VR environment according to an embodiment of this application. As shown in FIG. 18, a self-made handle model is displayed. The handle model exists in virtual 3D space in a game environment. A position of a handle in virtual space is in a one-to-one correspondence with a position of a handle in real space. A user controls the handle in the real space with a hand to control the handle in the virtual space.

In an embodiment, the game handle may be a Vive handle, an Oculus Touch handle, or a corresponding detachable VR handle.

It is noted that, regardless of a position of the handle in the virtual space, when a user presses a menu key on a physical handle (when a user presses a menu key on a Vive handle or presses an A/X key on an Oculus Touch handle), a menu object needing to be displayed in the virtual space is generated at the position of the handle, and then moves to a predetermined target position that is calculated.

In an embodiment, the target position may be a relative position around the position of the handle.

Figure 19:
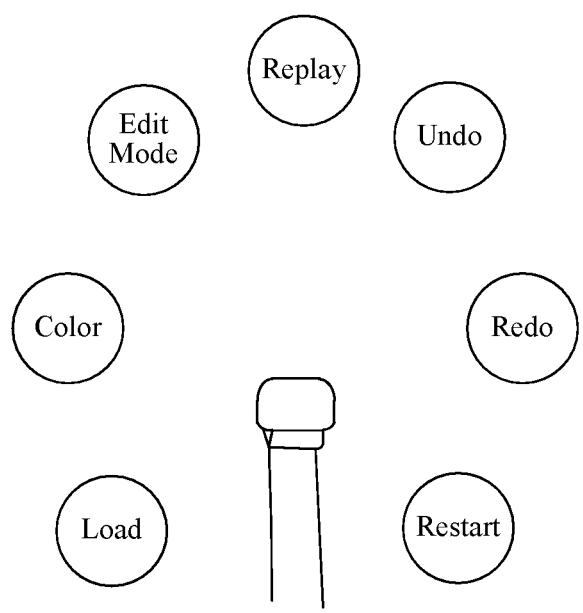
FIG. 19 is a schematic diagram of another hand menu in a VR environment according to an embodiment of this application.

FIG. 19 is a schematic diagram of another optional hand menu in a VR environment according to an embodiment of this application. As shown in FIG. 19, the target position may use a position of the handle in the virtual space at a moment when a button is pressed as an original position, a circular plane is created by using the original position as a circle center and a radius of 20 cm, and a plurality of selection objects is arranged around the circular plane at equal spacing. A normal vector of the circular plane faces a camera in a virtual world, that is, the normal vector of the circular plane faces a viewing direction of the user.

In the solution provided in this application, the handle in the virtual space is a 3D model, and each menu option appearing around the handle is also a 3D model. A position of the handle in the virtual space is in a one-to-one correspondence with a position of the handle in the real space, and a position of a menu option in the virtual space is also in a one-to-one correspondence with a position in the real space.

In the solution provided in this application, at a moment when the user presses a menu button, a plurality of menu options is triggered, so that the plurality of menu options appears at a fixed position in the virtual world, and a position of the virtual menu indicated by the 3D models is not changed again, until the menu disappears when the interaction process ends.

In an embodiment, after the user presses the menu key to display the menu, the user may keep the menu key in a pressed state, and if the user releases the menu key, the entire menu interaction process ends.

It is noted that, in the menu interaction process, other operation behaviors such as triggering of a menu option are irrelevant to a key on the handle. The menu key controls appearance and disappearance of the entire menu in the interaction process.

In the solution provided in this application, in any time period, the position, in the virtual space, of the handle in the virtual space is in a one-to-one correspondence with the position, in the real space, of the handle in the real space. Therefore, when these virtual menu options appear, it is assumed that touching these virtual menu objects by the user with the handle is triggering functions corresponding to identifiers of these menu options. When a movement position of the handle collides with the menu option, a menu function is triggered.

Figure 20:
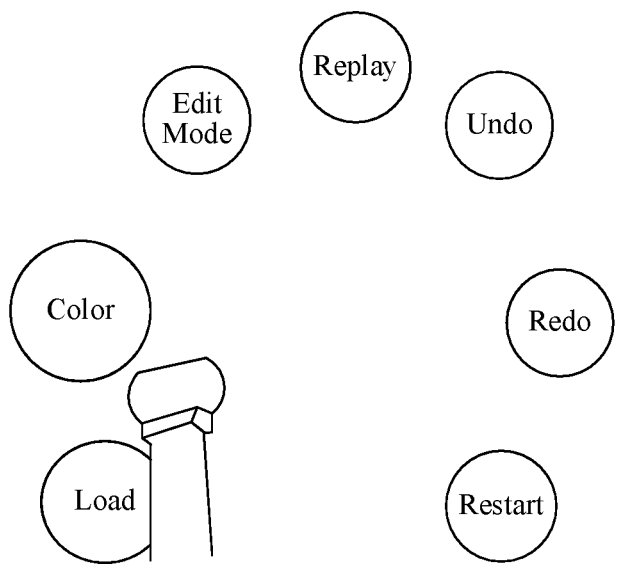
FIG. 20 is a schematic diagram of another hand menu in a VR environment according to an embodiment of this application.

FIG. 20 is a schematic diagram of another optional hand menu in a VR environment according to an embodiment of this application. As shown in FIG. 20, in a process in which the handle moves, a size of a menu option may be designed to be larger as a distance between the handle and the menu option is shorter, and the size of the menu option may be designed to be smaller as the distance between the handle and the menu option is longer, to guide the user to touch these menu options according to the prompt.

In an embodiment, when the user touches the menu object, the function corresponding to the menu is triggered, and the function may be specified game logic and is closing the menu, or may be opening a menu of a next level.

Figure 21:
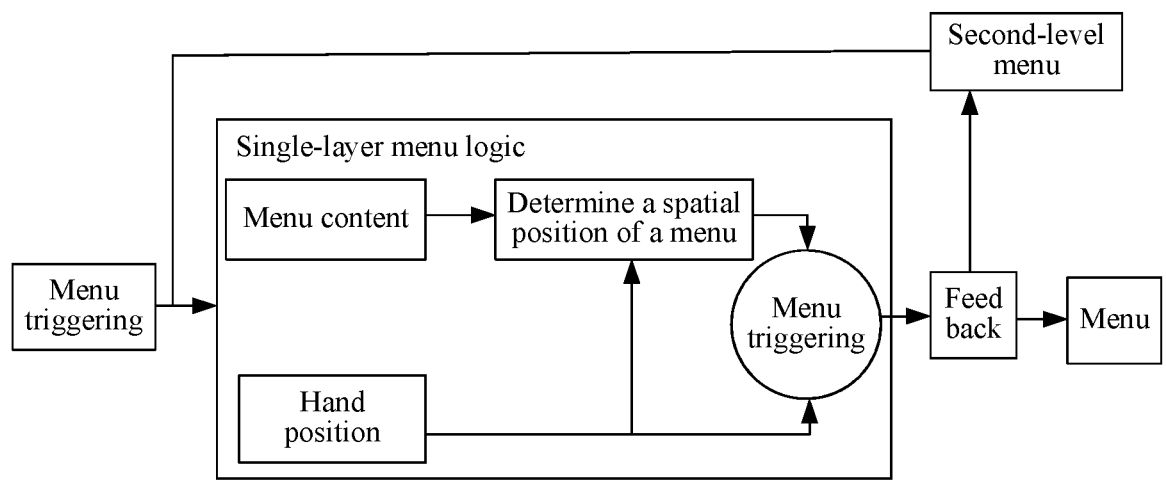
FIG. 21 is a schematic diagram of an optional menu control logic according to an embodiment of this application.

FIG. 21 is a schematic diagram of an optional menu control logic according to an embodiment of this application. As shown in FIG. 21, after a request for "menu triggering" is sent, "single-layer menu logic" is entered, corresponding menu logic is executed according to the "single-layer menu logic", a "feedback" of an execution result is provided, "menu disappearance" or opening of the "second-level menu" may be selected according to a "feedback" result, and if the "second-level menu" is executed, the "single-layer menu logic" is returned to perform second menu logic.

In an embodiment, a manner of starting one menu interaction may include manners of the "menu triggering" and the "second-level menu". The "menu triggering" indicates that the user presses the menu key, and the "second-level menu" indicates that a menu option triggered by the user further enables a new second-level menu option. In this case, a previous-level menu option disappears to complete a previous menu interaction, and a new menu option is generated to start current menu interaction.

In an embodiment, a manner of ending one menu interaction may also include manners of the "menu triggering" and the "menu disappearance". The "menu triggering" indicates that the user moves the handle to touch one menu option. In this case, regardless of whether to enable a next-level menu or execute preset logic of a menu option, before this, a first step is to destroy all current menu options. The "menu disappearance" indicates that the user collides with no option in the current menu interaction, but releases the menu button. In this case, a behavior of ending current "single-layer menu logic" is triggered.

It is noted that, there is execution logic for one menu interaction in the "single-layer menu logic".

In an embodiment, the "single-layer menu logic" includes an initialization phase and an execution phase.

After one menu interaction is started, the initialization phase is first entered to generate a menu option.

In an embodiment, content of a current hand menu to be displayed is determined according to a current game environment. An implementation method may be: identifying a type of a current menu by storing a variable in the hand menu, and predefining content of the hand menu that is to be displayed for each type. When the user presses the menu button, the current game environment is checked, and a value of a variable for the menu type is determined as a parameter for creating a current menu option, to implement "menu content generation".

A second step in initialization is "determining a menu space position". An implementation method may arrange, by using an algorithm according to a current "handle position", all menu options around a handle position at a moment when the menu is pressed.

In an embodiment, the algorithm may use a position of the handle in the virtual space at a moment when a button is pressed as an original position, create a circular plane by using the original position as a circle center and a radius of 20 cm, and arrange a plurality of selection objects around the circular plane at equal spacing. A normal vector of the circular plane faces a camera in a virtual world, that is, the normal vector of the circular plane faces a viewing direction of the user. In addition, a collider and a position of each menu option are stored.

Then the execution phase is entered. Logic to be expected for each frame of image in the virtual space is: obtaining a "handle position" of a current virtual hand, and then performing a next step to determine whether the "handle position" of the current virtual hand satisfies an ending condition, and if the ending condition is not satisfied, the step is circularly continued.

It is noted that, the ending condition may include the following cases, for example, the user releases the menu button; and the "handle position" of the current virtual hand collides with any menu option. Current menu interaction ends provided that any one of the foregoing conditions is satisfied, to complete a "single-layer logic menu"

According to an embodiment of this application, the display is more accordant with the user in a psychological level, and a virtual hand is used for touching a virtual article and object to give feedbacks of visual, auditory, and touch senses, so that the user's feeling is more real in the VR environment.

According to an embodiment of this application, the user can fast select a menu in the VR environment.

According to an embodiment of this application, any detachable handle for which a position in the 3D space can be obtained can be supported by the solutions in this application.

In an embodiment of this application, the menu key can be adjusted randomly.

In an embodiment of this application, there may be diversified algorithms for a position at which the menu option appears, and use of the algorithm in an embodiment can more conform to a selection habit of the user for selection.

In an embodiment of this application, the solution of holding (e.g., always holding) the key to display the menu may also be implemented in another manner. For example, menu interaction is started by pressing the key, and the menu interaction ends by pressing the key again.

In an embodiment of this application, there are diversified menu reflection animations in a movement process of the handle. Details are not described herein one by one.

It is noted that for simple descriptions, the method embodiments are stated as a series of action combinations. However, a person skilled in the art should know that this application is not limited to the sequence of the described actions because according to this application, some steps may use another sequence or may be simultaneously performed.

Based on the embodiments, a person skilled in the art may clearly understand that the method in the embodiments may be implemented by software in addition to a universal hardware platform or may be certainly implemented by hardware. However, the former is a better implementation in most cases. Based on such an understanding, the technical solutions of this application essentially or the part contributing to the related technology may be implemented in a form of a software product. The computer software product is stored in a storage medium (such as a read-only memory (ROM)/random access memory (RAM), a magnetic disk, or an optical disc) and includes several instructions for instructing a terminal device (which may be a mobile phone, a computer, a server, a network device, or the like) to perform the object processing method in a virtual scene described in the embodiments of this application.

Figure 22:
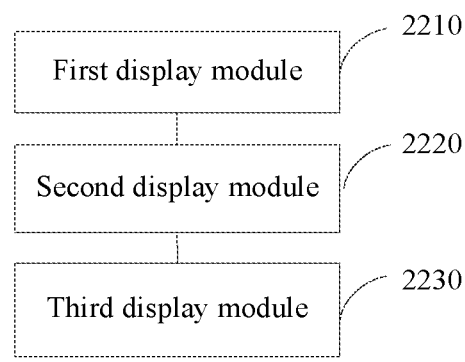
FIG. 22 is a block diagram of a gesture display apparatus for a VR scene according to an embodiment of this application.

FIG. 22 is a block diagram of a gesture display apparatus for a VR scene according to an embodiment of this application. The gesture display apparatus for a VR scene may be implemented, by software, hardware, or a combination thereof, as a part or all of a VR device. The gesture display apparatus for a VR scene includes a first display module 2210, a second display module 2220, and a third display module 2230.

The first display module 2210 can implement a display function related to step 201.

The second display module 2220 can implement a display function related to step 202.

The third display module 2230 can implement a display function related to step 203.

In an embodiment, the apparatus further includes a first receiving module, a first determining module, a second determining module, a first detection module, and a third determining module.

The first receiving module can receive the input signal sent by the input device, where the input signal is a signal acquired according to a motion status of a real hand corresponding to the first gesture object in a real environment.

The first determining module can determine a gesture position of the first gesture object in a virtual environment according to the input signal.

The second determining module can determine a ray position of the ray in the virtual environment according to the gesture position.

The first detection module can detect whether the ray position overlaps an article position of the virtual article in the virtual environment.

The third determining module can determine, when the ray position overlaps the article position, that the ray intersects the virtual article.

In an embodiment, the third display module 2230 can display, after the first gesture object is displayed, the third gesture object when the first gesture object intersects the virtual article and the selection instruction is received.

In an embodiment, the apparatus further includes a second receiving module, a fourth determining module, a second detection module, and a fifth determining module.

The second receiving module can receive the input signal sent by the input device, where the input signal is a signal acquired according to a motion status of a real hand corresponding to the first gesture object in a real environment.

The fourth determining module can determine a gesture position of the first gesture object in a virtual environment according to the input signal.

The second detection module can detect whether the gesture position overlaps an article position of the virtual article in the virtual environment.

The fifth determining module can determine, when the gesture position overlaps the article position, that the first gesture object intersects the virtual article.

In an embodiment, the third display module 2230 can display, according to a type of the virtual article, a third gesture object corresponding to the type.

In an embodiment, the apparatus further includes a fourth display module.

The fourth display module can display the virtual article in a preset display manner when it is determined, according to the input signal sent by the input device, that the ray intersects the virtual article.

In an embodiment, the first display module 2210 can display the first gesture object when a placement instruction is received.

In an embodiment, the apparatus further includes a fifth display module.

The fifth display module can display a fourth gesture object when a press instruction corresponding to a predetermined key is received, where the fourth gesture object is a gesture object of a finger corresponding to the predetermined key in a curled state.

In an embodiment, the apparatus further includes a sixth display module.

The sixth display module can display a fifth gesture object when a release instruction corresponding to the predetermined key is received, where the fifth gesture object is a gesture object of the finger corresponding to the predetermined key in a spread state.

Specifically, for details, refer to an embodiment of the gesture display method for a VR scene.

Figure 23:
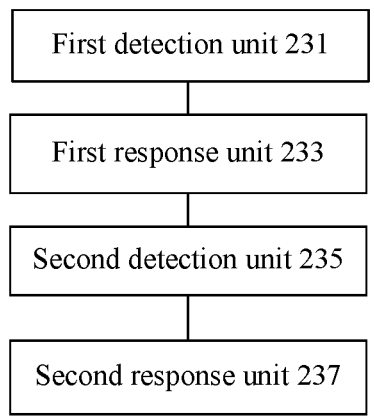
FIG. 23 is a schematic diagram of an object processing apparatus in a virtual scene according to an embodiment of this application.

According to an embodiment of this application, an object processing apparatus in a virtual scene configured to implement an object processing method in a virtual scene is further provided. FIG. 23 is a schematic diagram of an optional object processing apparatus in a virtual scene according to an embodiment of this application. As shown in FIG. 23, the apparatus may include:

a first detection unit 231, configured to detect a first operation performed on a first target object in a real scene; a first response unit 233, configured to generate, in response to the first operation, at least one first menu object corresponding to a second target object in a virtual scene, the second target object being a virtual object in the virtual scene that corresponds to the first target object; a second detection unit 235, configured to detect a second operation performed on the first target object, the second operation being used for instructing to move the second target object to a position of a target menu object in the at least one first menu object in the virtual scene; and a second response unit 237, configured to perform a target processing operation in the virtual scene in response to the second operation, the target processing operation being a processing operation corresponding to the target menu object, and each of the at least one first menu object corresponding to one processing operation.

It is noted that, the first detection unit 231 in this embodiment may be configured to perform step S1702 in the embodiments of this application; the first response unit 233 in this embodiment may be configured to perform step S1704 in the embodiments of this application; the second detection unit 235 in this embodiment may be configured to perform step S1706 in the embodiments of this application; and the second response unit 237 in this embodiment may be configured to perform step S1708 in the embodiments of this application.

It is noted herein that examples and application scenarios implemented by the modules and corresponding steps are the same but are not limited to the content disclosed in the embodiments. It is noted that, the modules may be run in the hardware environment shown in FIG. 16 as a part of the apparatus, and may be implemented by software or may be implemented by hardware (e.g., by processing circuitry).

Figure 24:
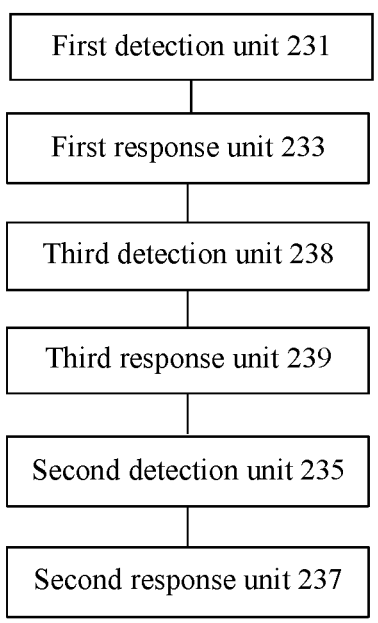
FIG. 24 is a schematic diagram of another object processing apparatus in a virtual scene according to an embodiment of this application.

In an optional embodiment, as shown in FIG. 24, this embodiment may further include a third detection unit 238 and a third response unit 239. After the at least one first menu object corresponding to the second target object is generated in the virtual scene in response to the first operation, the third detection unit 238 detects a third operation performed on the first target object, and the third response unit 239 deletes the at least one first menu object from the virtual scene in response to the third operation.

Figure 25:
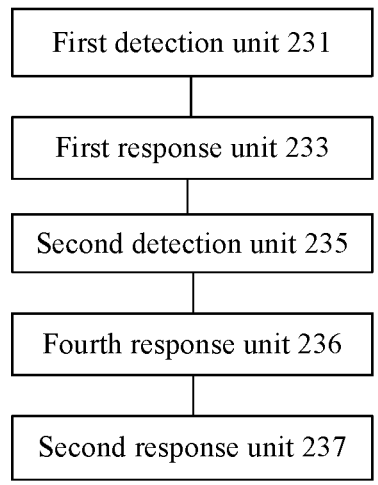
FIG. 25 is a schematic diagram of another object processing apparatus in a virtual scene according to an embodiment of this application.

In an optional embodiment, as shown in FIG. 25, this embodiment may further include a fourth response unit 236. Before the target processing operation is performed in the virtual scene in response to the second operation, the fourth response unit 236 sets a tag for the target menu object in the virtual scene in response to the second operation, where the tag is used for instructing to move the second target object to the position of the target menu object.

Figure 26:
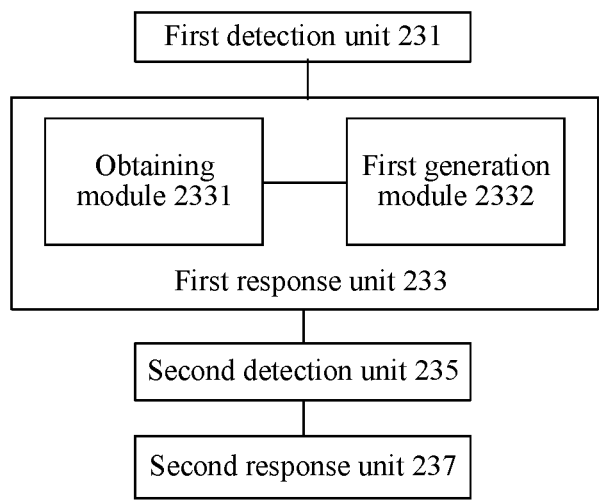
FIG. 26 is a schematic diagram of another object processing apparatus in a virtual scene according to an embodiment of this application.

In an optional embodiment, as shown in FIG. 26, the first response unit 233 may include an obtaining module 2331 and a first generation module 2332. The obtaining module 2331 obtains a current target scene in the virtual scene when the first operation is detected. The first generation module 2332 generates, around the second target object in the virtual scene according to a predetermined correspondence between a virtual scene and a menu object, the at least one first menu object corresponding to the target scene.

Figure 27:
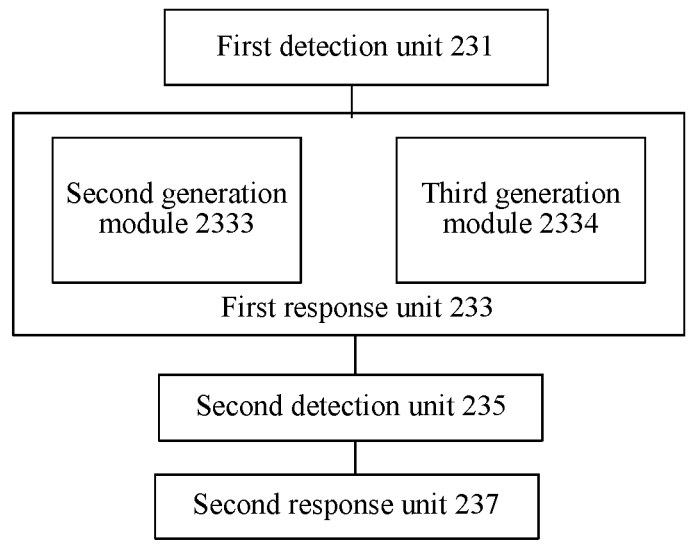
FIG. 27 is a schematic diagram of another object processing apparatus in a virtual scene according to an embodiment of this application.

In an optional embodiment, as shown in FIG. 27, the first response unit 233 may include at least one of a second generation module 2333 and a third generation module 2334. The second generation module 2333 generates the at least one first menu object at predetermined circumference with a predetermined gap, where the predetermined circumference is a circumference formed by using a position of the second target object as a circle center and a predetermined distance as a radius. The third generation module 2334 generates the at least one first menu object in a predetermined arrangement order in a predetermined direction of the second target object, where the predetermined direction includes at least one of the following: above, below, left, and right, and the predetermined arrangement order includes at least one of the following: a linear arrangement order and a curved arrangement order.

Figure 28:
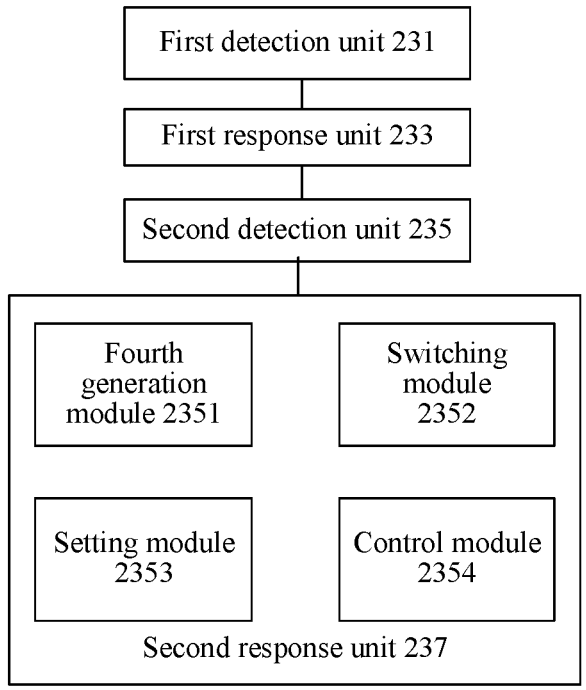
FIG. 28 is a schematic diagram of another object processing apparatus in a virtual scene according to an embodiment of this application.

In an optional embodiment, as shown in FIG. 28, the second response unit 237 may include at least one of a fourth generation module 2351, a switching module 2352, a setting module 2353, and a control module 2354. The fourth generation module 2351 generates at least one second menu object in the virtual scene, where the at least one second menu object is a drop-down list object of the target menu object. The switching module 2352 switches a first scene in the virtual scene to a second scene. The setting module 2353 sets an attribute of an operation object in the virtual scene to a target attribute The control module 2354 controls the operation object in the virtual scene to execute a target task.

The modules detect a first operation performed on a first target object; generate, in a virtual scene according to the detected first operation, a plurality of first menu objects around a second target object corresponding to the first target object; detect a second operation performed on the first target object; and instructs the second target object in the virtual scene is instructed to move to a position of a target menu object in the first menu object according to the detected second operation. When the second target object in the virtual scene moves to the position of the target object, a target processing operation is performed in the virtual scene, without simulating a mouse, and 3D spatial coordinates are converted in to a 2D spatial position for an operation, to resolve a technical problem in a related technology that a ray is emitted to position a menu option in a 2D menu panel in a virtual scene, leading to a relatively complex menu selection operation in the virtual scene, thereby directly performing an operation by using 3D spatial coordinates, and making the menu selection operation in the more convenient.

Figure 29:
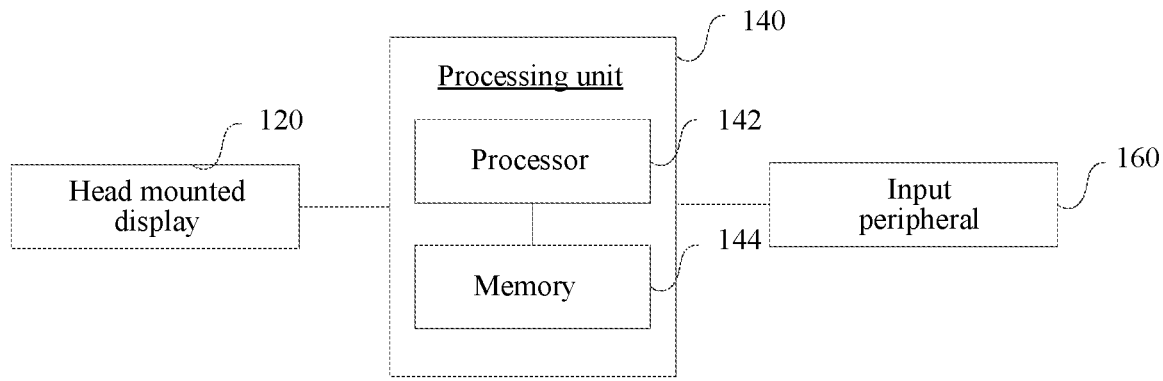
FIG. 29 is a block diagram of a VR system according to an embodiment of this application.

FIG. 29 is a schematic structural diagram of a VR system according to an embodiment of this application. The VR system includes a head mounted display 120, a VR host 140, and an input device 160.

The head mounted display 120 is a display to be worn on a head of a user for image display.

The head mounted display 120 is electrically connected to the VR host 140 by using a flexible circuit board or a hardware interface.

The VR host 140 is generally integrated into the head mounted display 120. The VR host 140 includes a processor 142 and a memory 144. The memory 144 is volatile and non-volatile media, and removable and non-removable media implemented by using any method or technology and configured to store information such as a computer-readable instruction, a data structure, a program module, or other data, for example, a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. The memory 144 stores one or more program instructions. The program instruction includes an instruction for implementing the gesture display method for a VR scene provided in the method embodiments, or an instruction for implementing the object processing method in a virtual scene provided in the method embodiments. The processor 142 is configured to execute the instruction in the memory 144 to implement the gesture display method for a VR scene provided in the method embodiments, or implement the object processing method in a virtual scene provided in the method embodiments. The VR host 140 is connected to the input device 160 through a cable or Bluetooth connection or a Wi-Fi connection.

The input device 160 is an input peripheral such as a somatosensory glove, a somatosensory handle, a remote control, a treadmill, a mouse, a keyboard, and a human eye focusing device.

This application provides a computer-readable storage medium. The computer-readable storage medium stores at least one instruction, the at least one instruction being loaded and executed by the processor to implement the gesture display method for a VR scene provided in the method embodiments.

This application further provides a computer program product. When the computer program product is run on a computer, the computer is enabled to perform the gesture display method for a VR scene provided in the method embodiments.

An embodiment of this application further provides a terminal configured to implement the object processing method in a virtual scene.

Figure 30:
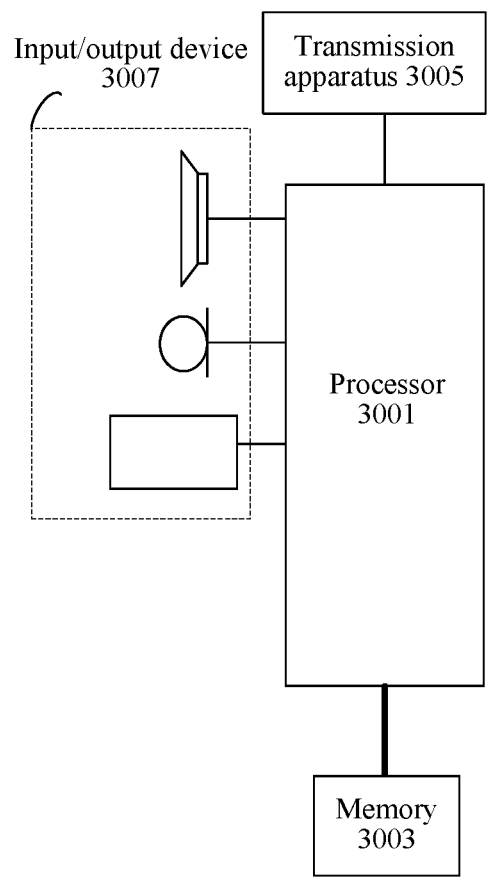
FIG. 30 is a structural block diagram of a terminal according to an embodiment of this application.

FIG. 30 is a structural block diagram of a terminal according to an embodiment of this application. As shown in FIG. 30, the terminal may include one or more (one is shown) processors 3001, a memory 3003, and a transmission apparatus 3005. As shown in FIG. 30, the terminal may further include an input/output device 3007.

The memory 3003 may be configured to store a software program and module, for example, a program instruction/module corresponding to the object processing method and apparatus in a virtual scene in the embodiments of this application; or a program instruction/module corresponding to the gesture display method and apparatus for a VR scene. The processor 3001 performs various functional applications and data processing by running the software program and the module stored in the memory 3003, that is, implements the object processing method in a virtual scene, or the gesture display method for a VR scene.

The memory 3003 may include a high-speed random memory, and may also include a nonvolatile memory such as one or more magnetic storage apparatuses, a flash memory, or another nonvolatile solid-state memory. In some embodiments, the memory 3003 may further include memories remotely disposed relative to the processor 3001, and these remote memories may be connected to the terminal through a network. Examples of the network include, but are not limited to, the Internet, an intranet, a local area network, a mobile communications network, and a combination thereof.

The transmission apparatus 3005 is configured to receive or send data through a network. Specific examples of the network may include a wired network and a wireless network. In an embodiment, the transmission apparatus 3005 includes a network interface controller (NIC) that may be connected to another network device and a router by using a network cable, thereby communicating with the Internet or a local area network. In an embodiment, the transmission apparatus 3005 is a radio frequency (RF) module that is configured to communicate with the Internet in a wireless manner.

Specifically, the memory 3003 is configured to store an application program.

The processor 3001 may invoke the application program stored in the memory 3003, to perform the following steps: detecting a first operation performed on a first target object in a real scene; generating, in response to the first operation, at least one first menu object corresponding to a second target object in a virtual scene, the second target object being a virtual object in the virtual scene that corresponds to the first target object; detecting a second operation performed on the first target object, the second operation being used for instructing to move the second target object to a position of a target menu object in the at least one first menu object in the virtual scene; and performing a target processing operation in the virtual scene in response to the second operation, the target processing operation being a processing operation corresponding to the target menu object, and each of the at least one first menu object corresponding to one processing operation.

The processor 3001 is further configured to perform the following steps: detecting a third operation performed on the first target object; and deleting the at least one first menu object from the virtual scene in response to the third operation.

The processor 3001 is further configured to perform the following step: setting a tag for the target menu object in the virtual scene in response to the second operation, where the tag is used for instructing to move the second target object to the position of the target menu object.

The processor 3001 is further configured to perform the following steps: obtaining a current target scene in the virtual scene when detecting the first operation; and generating, around the second target object in the virtual scene according to a predetermined correspondence between a virtual scene and a menu object, the at least one first menu object corresponding to the target scene.

The processor 3001 is further configured to perform the following steps: generating the at least one first menu object at predetermined circumference with a predetermined gap, where the predetermined circumference is circumference formed by using a position of the second target object as a circle center and a predetermined distance as a radius; and generating the at least one first menu object in a predetermined arrangement order in a predetermined direction of the second target object, where the predetermined direction includes at least one of the following: above, below, left, and right, and the predetermined arrangement order includes at least one of the following: a linear arrangement order and a curved arrangement order.

The processor 3001 is further configured to perform the following steps: generating at least one second menu object in the virtual scene, where the at least one second menu object is a drop-down list object of the target menu object; switching a first scene in the virtual scene to a second scene; setting an attribute of an operation object in the virtual scene to a target attribute; and controlling the operation object in the virtual scene to execute a target task.

According to this embodiment of this application, an object processing solution in a virtual scene is provided. A first operation performed on a first target object is detected; a plurality of first menu objects is generated, according to the detected first operation, in a virtual scene around a second target object corresponding to the first target object; a second operation performed on the first target object is detected; and the second target object in the virtual scene is instructed, according to the detected second operation, to move to a position of a target menu object in the first menu object. When the second target object in the virtual scene moves to the position of the target object, a target processing operation is performed in the virtual scene, without simulating a mouse, and 3D spatial coordinates are converted in to a 2D spatial position for an operation, to resolve a technical problem in a related technology that a ray is emitted to position a menu option in a 2D menu panel in a virtual scene, leading to a relatively complex menu selection operation in the virtual scene, thereby directly performing an operation by using 3D spatial coordinates, and making the menu selection operation in the virtual scene more convenient.

A person of ordinary skill in the art may understand that, the structure shown in FIG. 30 is an example. The terminal may be a terminal device such as a smartphone (for example, an Android mobile phone or an iOS mobile phone), a tablet computer, a palmtop computer, a mobile internet device (MID), or a PAD. FIG. 30 does not limit the structure of the electronic apparatus. For example, the terminal may further include more or less components (such as a network interface and a display apparatus) than those shown in FIG. 30, or has a configuration different from that shown in FIG. 30.

A person of ordinary skill in the art may understand that all or some of the steps of the methods of the embodiments may be implemented by a program instructing relevant hardware of the terminal device. The program may be stored in a computer readable storage medium. The storage medium may be a flash disk, a ROM, a RAM, a magnetic disk, or an optical disc.

An embodiment of this application further provides a storage medium. In an embodiment, in this embodiment, the storage medium may be configured to execute program code for the object processing method in a virtual scene. The storage medium stores at least one instruction. The at least one instruction is loaded and executed by the processor to implement the object processing method in a virtual scene provided in the method embodiments.

This application further provides a computer program product. When the computer program product is run on a computer, the computer is enabled to perform the object processing method in a virtual scene provided in the method embodiments.

In an embodiment, in this embodiment, the storage medium may be located on at least one network device of the plurality of network devices in the network shown in FIG. 16.

In an embodiment, in this embodiment, the storage medium is configured to store program code for performing the following steps:

S1: Detect a first operation performed on a first target object in a real scene.

S2: Generate, in response to the first operation, at least one first menu object corresponding to a second target object in a virtual scene. The second target object is a virtual object in the virtual scene that corresponds to the first target object.

S3: Detect a second operation performed on the first target object. The second operation is used for instructing to move the second target object to a position of a target menu object in the at least one first menu object in the virtual scene.

S4: Perform a target processing operation in the virtual scene in response to the second operation. The target processing operation is a processing operation corresponding to the target menu object, and each of the at least one first menu object corresponds to one processing operation.

In an embodiment, the storage medium is further configured to store program code for performing the following steps: detecting a third operation performed on the first target object; and deleting the at least one first menu object from the virtual scene in response to the third operation.

In an embodiment, the storage medium is further configured to store program code for performing the following step: setting a tag for the target menu object in the virtual scene in response to the second operation, where the tag is used for instructing to move the second target object to the position of the target menu object.

In an embodiment, the storage medium is further configured to store program code for performing the following steps: obtaining a current target scene in the virtual scene when detecting the first operation; and generating, around the second target object in the virtual scene according to a predetermined correspondence between a virtual scene and a menu object, the at least one first menu object corresponding to the target scene.

In an embodiment, the storage medium is further configured to store program code for performing the following steps: generating the at least one first menu object at predetermined circumference with a predetermined gap, where the predetermined circumference is circumference formed by using a position of the second target object as a circle center and a predetermined distance as a radius; and generating the at least one first menu object in a predetermined arrangement order in a predetermined direction of the second target object, where the predetermined direction includes at least one of the following: above, below, left, and right, and the predetermined arrangement order includes at least one of the following: a linear arrangement order and a curved arrangement order.

In an embodiment, the storage medium is further configured to store program code for performing the following steps: generating at least one second menu object in the virtual scene, where the at least one second menu object is a drop-down list object of the target menu object; switching a first scene in the virtual scene to a second scene; setting an attribute of an operation object in the virtual scene to a target attribute; and controlling the operation object in the virtual scene to execute a target task.

In an embodiment, for a specific example in this embodiment, refer to the example described in the embodiment of the object processing method in a virtual scene, and details are not described herein again in this embodiment.

In an embodiment, in this embodiment, the storage medium may include, but is not limited to: any medium that can store program code, such as a USB flash drive, a read only memory (ROM), a random access memory (RAM), a removable hard disk, a magnetic disk, or an optical disc.

If the integrated units in the embodiments are implemented in a form of software functional units and are sold or used as an independent product, the units may be stored in a computer readable storage medium. Based on such understanding, the technical solutions of this application essentially, or some contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the embodiments provided in this application, it is understood that the disclosed client may be implemented in other manners. The described apparatus embodiments are schematic. For example, division of the units is division of logic functions, and there may be another division manner during another implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

A person of ordinary skill in the art may understand that all or some of the steps of the embodiments may be implemented by using hardware (e.g., processing circuitry), or may be implemented by a program instructing relevant hardware. The program may be stored in a computer readable storage medium. The storage medium may be non-transitory computer-readable storage medium such as a ROM, a magnetic disk, an optical disc, or the like.

The descriptions are exemplary embodiments of this application, but are not intended to limit this application. Any modification, equivalent replacement, or improvement made within the spirit and principle of this application shall fall within the protection scope of this application.

What is claimed is:

1. A method for displaying a gesture in a virtual reality (VR) environment, the method comprising:
    displaying, by processing circuitry of an apparatus, a first gesture of a virtual hand when the virtual hand does not hold a virtual article, the virtual hand having a virtual ray associated therewith and configured to detect when the virtual hand can interact with the virtual article, the virtual ray being hidden while the virtual ray does not intersect the virtual object;
    displaying, by the processing circuitry, a second gesture of the virtual hand when the virtual ray from the virtual hand intersects the virtual article, the second gesture of the virtual hand indicating that the virtual article is in front of the virtual hand, and the virtual ray is displayed within the VR environment as extending from a finger of the virtual hand to the virtual article when the virtual ray intersects the virtual article; and
    displaying, by the processing circuitry, a third gesture of the virtual hand in response to a selection instruction, the third gesture of the virtual hand indicating that the virtual hand holds the virtual article.

2. The method according to claim 1, wherein before the displaying the second gesture of the virtual hand, the method further comprises:
    determining, by the processing circuitry, a gesture position of the first gesture of the virtual hand in the VR environment according to a motion status of a hand in a real environment;
    determining, by the processing circuitry, a ray position of the virtual ray in the VR environment according to the gesture position;
    detecting, by the processing circuitry, whether the ray position overlaps an article position of the virtual article in the VR environment; and
    determining, by the processing circuitry and when the ray position overlaps the article position, that the virtual ray intersects the virtual article.

3. The method according to claim 1, wherein after the displaying the first gesture of the virtual hand, the method further comprises:
　　displaying, by the processing circuitry, the third gesture of the virtual hand when the first gesture of the virtual hand intersects the virtual article and the selection instruction is received.

4. The method according to claim 3, wherein before the displaying the third gesture of the virtual hand when the first gesture of the virtual hand intersects the virtual article and the selection instruction is received, the method further comprises:
　　determining, by the processing circuitry, a gesture position of the first gesture of the virtual hand in the VR environment according to a motion status of a hand in a real environment;
　　detecting, by the processing circuitry, whether the gesture position overlaps an article position of the virtual article in the VR environment; and
　　determining, by the processing circuitry and when the gesture position overlaps the article position, that the first gesture of the virtual hand intersects the virtual article.

5. The method according to claim 1, wherein the displaying the third gesture of the virtual hand comprises:
　　displaying, by the processing circuitry and according to a type of the virtual article, the third gesture of the virtual hand.

6. The method according to claim 1, further comprising:
　　displaying, by the processing circuitry, the virtual article in a preset display manner when the virtual ray intersects the virtual article, the preset display manner being different from an original display manner of the virtual article.

7. The method according to claim 1, wherein after the displaying the third gesture of the virtual hand, the method further comprises:
　　displaying, by the processing circuitry, the first gesture of the virtual hand in response to a placement instruction.

8. The method according to claim 1, wherein after the displaying the first gesture of the virtual hand, the method further comprises:
　　displaying, by the processing circuitry, a fourth gesture of the virtual hand in response to a press instruction, the fourth gesture of the virtual hand indicating that the finger of the virtual hand is in a curled state.

9. The method according to claim 8, wherein after the displaying the fourth gesture of the virtual hand, the method further comprises:
　　displaying, by the processing circuitry, a fifth gesture of the virtual hand in response to a release instruction, the fifth gesture of the virtual hand indicating that the finger of the virtual hand is in a spread state.

10. An apparatus for displaying a gesture in a virtual reality (VR) environment, the apparatus comprising processing circuitry configured to:
　　display a first gesture of a virtual hand when the virtual hand does not hold a virtual article, the virtual hand having a virtual ray associated therewith and configured to detect when the virtual hand can interact with the virtual article, the virtual ray being hidden while the virtual ray does not intersect the virtual object;
　　display a second gesture of the virtual hand when the virtual ray from the virtual hand intersects the virtual article, the second gesture of the virtual hand indicating that the virtual article is in front of the virtual hand, and the virtual ray is displayed in the VR environment as extending from a finger of the virtual hand to the virtual article when the virtual ray intersects the virtual article; and
　　display a third gesture of the virtual hand in response to a selection instruction, the third gesture of the virtual hand indicating that the virtual hand holds the virtual article.

11. The apparatus according to claim 10, wherein before the display of the second gesture of the virtual hand, the processing circuitry is further configured to:
　　determine a gesture position of the first gesture of the virtual hand in the VR environment according to a motion status of a hand in a real environment;
　　determine a ray position of the virtual ray in the VR environment according to the gesture position;
　　detect whether the ray position overlaps an article position of the virtual article in the VR environment; and
　　determine that the virtual ray intersects the virtual article when the ray position overlaps the article position.

12. The apparatus according to claim 10, wherein after the display of the first gesture of the virtual hand, the processing circuitry is further configured to:
　　display the third gesture of the virtual hand when the first gesture of the virtual hand intersects the virtual article and the selection instruction is received.

13. The apparatus according to claim 12, wherein before the display of the third gesture of the virtual hand when the first gesture of the virtual hand intersects the virtual article and the selection instruction is received, the processing circuitry is further configured to:
　　determine a gesture position of the first gesture of the virtual hand in the VR environment according to a motion status of a hand in a real environment;
　　detect whether the gesture position overlaps an article position of the virtual article in the VR environment; and
　　determine that the first gesture of the virtual hand intersects the virtual article when the gesture position overlaps the article position.

14. The apparatus according to claim 10, wherein the processing circuitry is further configured to:
　　display the third gesture of the virtual hand according to a type of the virtual article.

15. The apparatus according to claim 10, wherein the processing circuitry is further configured to:
　　display the virtual article in a preset display manner when the virtual ray intersects the virtual article, the preset display manner being different from an original display manner of the virtual article.

16. The apparatus according to claim 10, wherein after the display of the third gesture of the virtual hand, the processing circuitry is further configured to:
　　display the first gesture of the virtual hand in response to a placement instruction.

17. The apparatus according to claim 10, wherein after the display of the first gesture of the virtual hand, the processing circuitry is further configured to:
　　display a fourth gesture of the virtual hand in response to a press instruction, the fourth gesture of the virtual hand indicating that the finger of the virtual hand is in a curled state.

18. The apparatus according to claim 17, wherein after the display of the fourth gesture of the virtual hand, the processing circuitry is further configured to:

display a fifth gesture of the virtual hand in response to a release instruction, the fifth gesture of the virtual hand indicating that the finger of the virtual hand is in a spread state.

19. A non-transitory computer-readable storage medium storing computer-readable instructions that, when executed by at least one processor, cause the at least one processor to perform a method comprising:
- displaying, in a virtual reality (VR) environment a first gesture of a virtual hand when the virtual hand does not hold a virtual article, the virtual hand having a virtual ray associated therewith and configured to detect when the virtual hand can interact with the virtual article, the virtual ray being hidden while the virtual ray does not intersect the virtual object;
- displaying a second gesture of the virtual hand when the virtual ray from the virtual hand intersects the virtual article, the second gesture of the virtual hand indicating that the virtual article is in front of the virtual hand, and the virtual ray is displayed in the VR environment as extending from a finger of the virtual hand to the virtual article when the virtual ray intersects the virtual object; and
- displaying a third gesture of the virtual hand in response to a selection instruction, the third gesture of the virtual hand indicating that the virtual hand holds the virtual article.

20. The non-transitory computer-readable storage medium according to claim 19, wherein before the displaying the second gesture of the virtual hand, the computer-readable instructions, when executed by the at least one processor, cause the at least one processor to perform:
- determining a gesture position of the first gesture of the virtual hand in the VR environment according to a motion status of a hand in a real environment;
- determining a ray position of the virtual ray in the VR environment according to the gesture position;
- detecting whether the ray position overlaps an article position of the virtual article in the VR environment; and
- determining the virtual ray intersects the virtual article when the ray position overlaps the article position.

* * * * *